(12) United States Patent
Fajkowski

(10) Patent No.: US 8,025,224 B2
(45) Date of Patent: *Sep. 27, 2011

(54) METHOD AND APPARATUS FOR COUPON MANAGEMENT AND REDEMPTION

(75) Inventor: Peter Fajkowski, Austin, TX (US)

(73) Assignee: Way Ahead IP LLC, Austin, TX (US)

( * ) Notice: Subject to any disclaimer, the term of this patent is extended or adjusted under 35 U.S.C. 154(b) by 56 days.
This patent is subject to a terminal disclaimer.

(21) Appl. No.: 12/115,309

(22) Filed: May 5, 2008

(65) Prior Publication Data

US 2008/0249878 A1 Oct. 9, 2008

Related U.S. Application Data

(63) Continuation of application No. 11/539,094, filed on Oct. 5, 2006, now Pat. No. 7,367,500, which is a continuation of application No. 11/140,227, filed on May 27, 2005, now abandoned, which is a continuation of application No. 09/297,532, filed on Jun. 28, 1999, now Pat. No. 6,932,270, which is a continuation of application No. PCT/US97/19246, filed on Oct. 27, 1997, which is a continuation of application No. 08/741,976, filed on Oct. 31, 1996, now Pat. No. 5,905,246.

(51) Int. Cl.
*G06F 7/20* (2006.01)

(52) U.S. Cl. .................... 235/383; 235/375

(58) Field of Classification Search .......... 235/375, 235/381, 383, 389, 492
See application file for complete search history.

(56) References Cited

U.S. PATENT DOCUMENTS

| 5,192,854 A * | 3/1993 | Counts ................... 235/375 |
| 5,905,246 A * | 5/1999 | Fajkowski ............... 235/375 |
| 6,232,270 B1 * | 5/2001 | Branly et al. ............ 504/117 |
| 7,240,023 B1 | 7/2007 | Powell |
| 7,367,500 B2 * | 5/2008 | Fajkowski ............... 235/383 |

* cited by examiner

*Primary Examiner* — Daniel St.Cyr

(74) *Attorney, Agent, or Firm* — Pehr B. Jansson; The Jansson Firm

(57) ABSTRACT

The present invention provides a system for the electronic management and redemption of coupons. The system includes an integrated coupon card comprising a microprocessor, a random access memory means, a scanner, and a communications port. The coupon card is capable of scanning coupon bar codes from paper coupons and receiving redemption requirement data from a periphery device. The coupon card will allow bar codes and redemption requirement data to be transferred to a periphery device and will store what bar codes were redeemed because they corresponded to purchase data received from a cash register memory. The system further includes one or more periphery devices having a microprocessor, a first communications port for communicating with said coupon card, and a second communications port for communicating with a cash register. The periphery devices receive purchase data from a cash register memory and compare said purchase data to coupon bar codes received from a coupon card in order to determine which coupons are redeemable. The system also includes a server computer which will be connected to the periphery devices. The server computer will collect redeemed coupon information from the periphery devices and also provide the periphery devices with information such redemption requirement data or coupons which may be loaded onto a coupon card. A clearing house will collect coupon redemption information from all servers in the system to create redemption reports. The clearing house allows redemption requirement data and other information to be transferred through the servers to individual periphery devices and/or coupon cards.

21 Claims, 18 Drawing Sheets

METHOD AND APPARATUS FOR COUPON MANAGEMENT AND REDEMPTION

This application is a continuation of U.S. patent application Ser. No. 11/539,094, filed Oct. 5, 2006, which is a continuation of U.S. patent application Ser. No. 11/140,227, filed May 27, 2005, now abandoned, which is a continuation of U.S. patent application Ser. No. 09/297,532 filed on Jun. 28, 1998, now U.S. Pat. No. 6,932,270, which is a continuation of PCT Patent Application Serial No. US 97/19246 filed on Oct. 27, 1997, which is a continuation of U.S. patent application Ser. No. 08/741,976 filed on Oct. 31, 1996, now U.S. Pat. No. 5,905,246, all of which are incorporated by reference herein in their entirety.

TECHNICAL FIELD

The present invention relates to an apparatus and method of recording, displaying, organizing, transporting, transferring and redeeming coupons and similar items having a bar code or UPC number. More particularly, the present invention relates to an apparatus and system that electronically reads and stores bar codes or UPC numbers from paper coupons and allows display, organization, transportation, transfer and redemption of the coupons without further use of the paper upon which the coupon is printed.

BACKGROUND ART

Currently a large marketing tool for both manufacturers and supermarket chains is the production, distribution and redemption of the retail, paper, product coupon. Manufacturers use coupons to stimulate consumers to purchase products by creating product awareness, prompting product trials or rewarding repeat product purchases. This results in manufacturers printing and distributing hundreds of billions of paper coupons a year. This practice of paper coupon distribution is widely considered to be inefficient, as well as a producer of large quantities of redemption fraud.

The first step in the coupon redemption process is the retrieval of paper coupons by the consumer from the newspaper Free Standing Inserts (FSIs) in which the coupons are published. Currently, the vast majority of the coupons that are included in FSIs each week in the United States go unredeemed. 1995's redemption rate stood at approximately 1.9 percent of all coupons distributed. The primary reason for low coupon redemption is that couponing is time-consuming for people. The use of the paper coupon requires the consumer to sit down each week, examine coupon FSIs, and cut out the coupons they want to use. This is not the only disincentive for consumers to use coupons. It is also estimated that coupons received at the time of checkout in the supermarket (which are related to purchases and do not need to be chosen or removed from an FSI) are only redeemed at approximately an 8 percent rate. This suggests that even when not required to cut coupons out of FSI's, consumers consider coupons too much trouble to constantly organize and carry about. The redeeming of paper coupons requires even more effort since the consumer must determine which coupons he has that match items on his shopping list or that match items which he has purchased. While many companies sell coupon organizers, coupon categorizers and coupon alphabetizers, these methods still require coupon clipping, constant coupon organization and maintenance (removing expired coupons). The ineffectiveness of these methods is evidenced by the consistently low redemption rates. Still another reason why coupons go unredeemed is because the consumer simply forgets and leaves the coupons at home when he goes shopping. This is even more likely to occur as shopping trips are increasingly incorporated into the drive home from work or the like rather than a specially planned trip to the supermarket. Thus the consumer loses any possible benefit of coupon discounts. As a result of these difficulties, the majority of consumers do not investigate FSIs for coupons and consequently, advertising dollars manufacturers spend on FSIs provide comparatively little promotional benefit. Therefore, while per page FSI costs are low, the inefficiency of paper couponing makes it a very expensive form of advertising.

Even after the consumer reaches the supermarket with his coupons, there are further problems with the present paper-based system. The most common system of redeeming coupons requires a paper coupon to be presented to a cashier when the consumer is checking out. The cashier scans the coupon bar code with a scanner associated with the cash register and the cash register software identifies whether the coupon corresponds to an item just purchased. When the consumer has numerous coupons, the individual scanning of each coupon can be very time consuming, delaying all other consumers waiting in line. This delay is greatly exacerbated when the cash register indicates that no corresponding product has been purchased for one or more of the coupons, stopping the transaction. To discover why a coupon is not appropriate, the cashier must examine the coupon and then review the cash register receipt to determine what aspect of the purchased product does not meet the coupon redemption requirements. In the case where the cashier desires to accept the inappropriate coupon as a customer service gesture, the cashier must "override" the cash register's rejection of the coupon. Typically this requires the pressing of several additional keys on the cash register. When this entire process must be repeated for multiple coupons not accepted by the cash register, which is common in the majority of transactions in which coupons are used, the delay disrupts the entire checkout process delaying consumer checkout and negatively affecting transaction speed, customer service and front-end productivity.

Further problems and inefficiencies in the coupon redemption process arise after the retailer has accepted the coupons from consumers. The retailer must determine the total value of each manufacturer's coupons the retailer has redeemed in order for the retailer to be reimbursed by the manufacturer. The method of doing this varies widely among retailers. Some retailers may have employees hand sort the coupons at the retailer's location. Other retailers may make no effort themselves to organize the coupons and keep records of what coupons have been redeemed. In either case, retailers periodically, such as on a weekly basis, collect all redeemed paper coupons and deliver the coupons to a third-party clearinghouse. At the clearinghouse, coupons are generally sorted either by hand, or perhaps by scanning, in order to determine what coupons belong to which manufacturer and the amount the manufacturer owes the retailer for redeeming the coupons. After the coupons are returned to the manufacturer, the manufacturer may again sort the coupons (using its own employees or another clearinghouse) to insure all the coupons are the manufacturer's. The manufacturer then recalculates the total value of the coupons in order to verify the amount the retailer claims is owed on the redeemed coupons. This process is completed for every one of the billions of coupons redeemed annually. By the time the coupons have been collected by the retailer, passed through one and possibly two clearinghouses, and the manufacture reimburses the retailer, several weeks or months may have passed. This results in a considerable disadvantage to the retailer since the time between when the retailer gives the consumer the coupon discount and when the manufacturer reimburses the retailer is, in effect, an interest-free loan to the manufacturer. The manufacturer also suffers from the slow redemption process since the manufacturer cannot determine the effect of the coupon promotion until the manufacturer receives information on the number of coupons redeemed. Therefore, it is impossible for a manufacturer to quickly react to product performance, coupon redemption rates, or market changes.

In addition to the legitimate redeeming process being cumbersome, there exists wide spread problems with fraudulent misredemption and malredemption. Misredemption occurs where a retailer accepts a coupon for a product that has not been purchased. When done on a selective basis as a customer service gesture, such misredemption may serve the retailer and manufacturer sufficiently to justify the fraud. For example, a coupon may be accepted where the customer has attempted to comply with the coupon but has mistakenly selected a size or quantity of the product which does not match what is called for by the coupon. However, the situation may arise where retailer personnel may accept large numbers of coupons that are not closely related to the products bought by the consumer. In such a case, the manufacturer eventually (whether initially or through an invoice reduction by the retailer following a manufacturer's refusal to pay) reimburses the retailer while receiving no corresponding benefit in sales. Some misredemption occurs internally by retail employees, and is fought by the retailer. In other cases, the retailer is intentionally involved in misredemption to increase profits. When retailers can not provide the appropriate invoices to support such coupon submissions, they are placed on suspend lists by the affected manufacturers and their coupons are no longer accepted for reimbursement. Such fraud prevention by manufacturers requires large financial resources for the staffing of coupon fraud reduction departments. Misredemption can run into the double digits for retailers, and manufacturers are plagued with the costs of paying for and preventing it. Malredemption is another type of coupon fraud often practiced on an even larger scale. Malredemption is the large scale collection of coupons which are then directly submitted to the manufacturer for reimbursement with the coupons never actually passing through consumers. Typically malredemption is carried out by illegitimate retailers acting as a "front" for persons who have set up mass coupon clipping systems. Together misredemption and malredemption cost manufacturers hundreds of millions of dollars annually.

Another disadvantage of the present paper coupon redemption system is that if consumer response to the coupon offer is not what the manufacturer had anticipated and the manufacturer wishes to restimulate consumers with a higher coupon discount, the manufacture must publish a whole new coupon "drop." The previously printed coupons, therefore, become a largely wasted marketing effort. Additionally, it is difficult to track the buying habits of consumers on a national level because those who purchase with cash are not recorded by conventional marketing database collection. On a local level, frequent shopper cards allow demographic and buying history profiles to be compiled on cash purchases, but this has not worked well on the national level.

DISCLOSURE OF THE INVENTION

The present invention comprises a system for electronically collecting, carrying and redeeming coupons which eliminates the many disadvantages consumers, retailers and manufacturers face when shepherding paper coupons through the redemption process. One component of the system is a portable coupon card which will include, among other features discussed more specifically in the detailed description, a bar code scanner, a memory means, a display screen, and a communications port, all controlled by a microprocessor and operational keys. The bar code scanner allows users to scan into the memory means the bar codes on coupons wherever a user may find the coupons. The display screen allows the user to view information concerning each coupon such as what product is represented by the coupon and the discount provided by the coupon. The microprocessor and operational keys allow the user to initiate the scanning of bar codes and arrange into various categories the coupons in the memory of coupon card, while the communications port will allow the transfer of coupon bar codes to a periphery device, another component of the system. Additionally, the coupon card may include an identification number which will allow the provider of the coupon card services to identify each individual to whom a coupon card is registered. The coupon card will allow users to scan large numbers of coupon bar codes directly from the FSI containing the coupons wherever the FSI may be found; thereby completely eliminating the necessity of clipping out, sorting and transporting a large number of paper coupons. Because the user of the coupon card is identifiable, the purchase habits of these individuals may be collected as marketing data regardless of whether or not the user pays with cash.

Another component of the present invention is a periphery device which will be positioned along the cash register stand in a retail store such as a supermarket. The periphery device will have an insertion port for receiving the coupon card, multiple communications ports allowing the periphery device to receive into a memory means electronic data from both the coupon card and the cash register, a microprocessor, operational keys and two display screens which allow the cashier and consumer to view the transactions taking place in the periphery device. During checkout, a consumer will insert the coupon card into the periphery device and the periphery device will read coupon bar codes from the coupon card and the periphery device will also receive data from the cash register indicating what products were purchased by the consumer. The periphery device will compare the data received from the cash register and the bar codes on the coupon card to determine what coupons are redeemable against the consumer's purchases. A list of redeemable coupons will then be displayed on the periphery device. Using the operational keys on the periphery device, the cashier may take care of any concerns the consumer has about the list of redeemable coupons. For example, the cashier may search the coupons on the coupon card for a coupon the consumer believes was mistakenly not included in the list of redeemed coupons. When that coupon is found, the periphery device will display a marker on the display screens indicating why the coupon was not redeemed. In the appropriate situation, the cashier may use an "override" operational key to include a coupon on the list of redeemed coupons even though that coupon is not technically appropriate for redemption. Other operational keys discussed herein will allow additional functions to be carried out by the periphery device. When a final list of redeemed coupons is agreed upon, the list will be transferred to the cash register for crediting against the consumer's purchases. Additionally, the periphery device will remove the coupons which were redeemed from the memory of the coupon card. Because all questions about individual coupons are handled efficiently at the same time before the redeemed coupons are sent to the cash register, the present invention greatly increases the speed of the coupon redemption process as compared to the prior art's method of individual, paper coupon processing because all overriding functions are performed before the bar codes are passed to the cash register, eliminating transaction interruption. As discussed more fully below, the periphery device, among other functions, will also be able to transmit data on future manufacturer coupons to the coupon card or place directly onto the coupon card coupons which will be ready for immediate use.

A still further component that could be utilized in the present invention is a local server computer. The server may be networked to all the periphery devices in the store and compile information from the peripheries concerning what coupons have been redeemed. Using this information, a program in the server may generate detailed reports for the store management concerning factors such as the total amount of each manufacturer's coupons redeemed (i.e. the amount the manufacturer should reimburse the retailer), the number of inappropriate coupons redeemed by overriding, and the number of coupons overridden by each cashier. The server can organize the information on redeemed coupons in any number of ways to accommodate the special needs of the particular store. Additionally, the server will transfer to the periphery device information that is intended for eventual loading by the periphery device onto coupon cards (e.g. information on future coupons or coupons for immediate use as discussed above).

Another component of the system will be a clearinghouse which will receive information on redeemed coupons from the servers of all the retailers participating in the system. The clearinghouse will then use this information from the servers to generate reports for each manufacturer regarding the amounts for which each retailer is entitled as reimbursement. The clearinghouse will also act as a remote database transferring information to the servers for the use and benefit of retailers, manufacturers and consumers alike. For example, the information for manufacturers' future coupons will be supplied to the clearinghouse and this information distributed to the servers. Similarly, coupon information for regional store chains could be supplied to the clearinghouse for distribution to the individual stores of that region. All of this information is intended for eventual loading onto a consumer's coupon card through the servers and periphery devices. Since each coupon card will have an identification number associated with its user and the clearinghouse is receiving from the periphery devices (through the servers) detailed information of the user's purchases, the clearinghouse will be able to compile a detailed database on the purchasing habits of all users of coupon cards. From this database, precise marketing profiles and reports can be provided to manufacturers and others parties seeking to gain information for marketing purposes.

The present invention further provides a method of altering the value of coupons once the coupon has been entered into the coupon card. The clearinghouse database will send information to the servers indicating that when a coupon card is entered into the periphery device, the periphery device should search the coupon card for the particular coupon whose value is to be altered. That coupon will then be replaced with a new coupon for the same item having a different value. This process can be repeated several times with ever increasing values for the coupon if desired by the product manufacturer. Therefore, unlike paper coupons which are static, coupons which can change in value may be used to restimulate a consumer each time the value of the coupon increases. Another method of the present invention will use the periphery, server, and database to make manufacturer rebates immediately available to consumers. In this method, the information on manufacturer rebates is supplied to the clearinghouse database and thereby made available to the periphery devices of the various stores. When the periphery device reads the products purchased from the cash register, the periphery device will indicate if there is a manufacturer rebate existing for any of the purchased products. This paperless rebate system allows the consumer to instantly receive credit for rebates, while quickly and efficiently supplying the manufacturer with both the demographic data and stimulation power the rebate is intended to provide.

The present invention also provides several methods for electronically distributing coupons as an alternative or in addition to coupons found in FSIs. One method will comprise a coupon dispenser located in the retail store. The dispenser will include, among other features, an insertion port to receive a coupon card, a communications port to exchange electronic information with the coupon card, a memory means, and a microprocessor and touch screen to allow the consumer to operate the dispenser. When the coupon card is inserted into the dispenser, the dispenser may load onto the coupon card various combinations of coupons to be selected on the touch screen by the consumer. The coupon dispenser may incorporate video and other types of advertising media which will reinforce to consumers the products for which they can immediately receive a coupon and purchase at a reduced price. Thus whereas conventional FSIs are static and reach only "coupon-clipping" consumers, the present invention provides full motion, color advertising with sound which will reach all consumers entering the retail store. Many additional functions of the coupon dispenser are discussed further in the detailed description.

Another apparatus of the present invention for electronically distributing coupons is an adapter allowing the coupon card to receive coupons from the Internet via the disk drive of a conventional computer. While it is known to receive coupons from the Internet, conventional systems transfer the coupon information to a printer to produce a printed paper coupon. This, of course, has all the disadvantages of paper coupons previously discussed. The adapter of the present invention avoids any need for paper by transmitting the coupon directly to the coupon card. The adapter will a have a insertion port for receiving the coupon card, a communications port, and a microprocessor. The adapter will also include a magnetic head for receiving electronic data from a corresponding magnetic head in the disk drive and the adapter will be sized to fit into the disk drive similar to a conventional "floppy" disk. When the computer receives electronic coupons from the Internet, the coupons will be sent to the computer's disk drive. The coupon card will have been positioned in the adapter's insertion port and the adapter placed in the computer's disk drive. The magnetic head in the disk drive will transmit the coupon information to the magnetic head of the adapter. The adapter will then transmit the coupon information to the coupon card through the adapter's communications port.

The present invention also includes an apparatus for receiving coupons from a database via telephone lines. The apparatus includes a telephone sub-component which allows the apparatus to dial the database. The apparatus further includes a modem, an insertion port for receiving a coupon card, a communications port, a memory means, a display screen, a microprocessor and operational keys. A coupon card is placed in the apparatus's insertion port and the database is dialed by the telephone sub-component. Coupon information is transferred from the database to the memory means via the modem. The microprocessor and operational keys allow the consumer to view on the display screen various coupons transferred by the database. When the consumer views a coupon he would like to obtain, an operational key directs the microprocessor to transfer that coupon to the coupon card via the communications port.

The present invention also includes the transmission of coupon data by way of digital pager frequency radio waves. One embodiment of the coupon card may include a radio frequency receiver. The consumer would preselect a group of coupons he wished to receive from the provider of the coupon card service. At a later date, the coupon card service provider would broadcast a pager signal, readable by that consumer's coupon card, which would contain the information corresponding with the preselected coupons. The consumer would receive the coupons on his coupon card as long as he was anywhere within the range of the pager broadcast.

Additional features of the present invention and many variations of the foregoing summarized embodiments will be apparent from the detailed description which follows.

DESCRIPTION OF THE DRAWINGS

FIG. 19b is a schematic view of the major components of the adapter of FIG. 19a.

FIG. 20b is a schematic view of the major components of the telephone interface of FIG. 20a.

BEST MODE OF CARRYING OUT THE INVENTION

Figure 1:
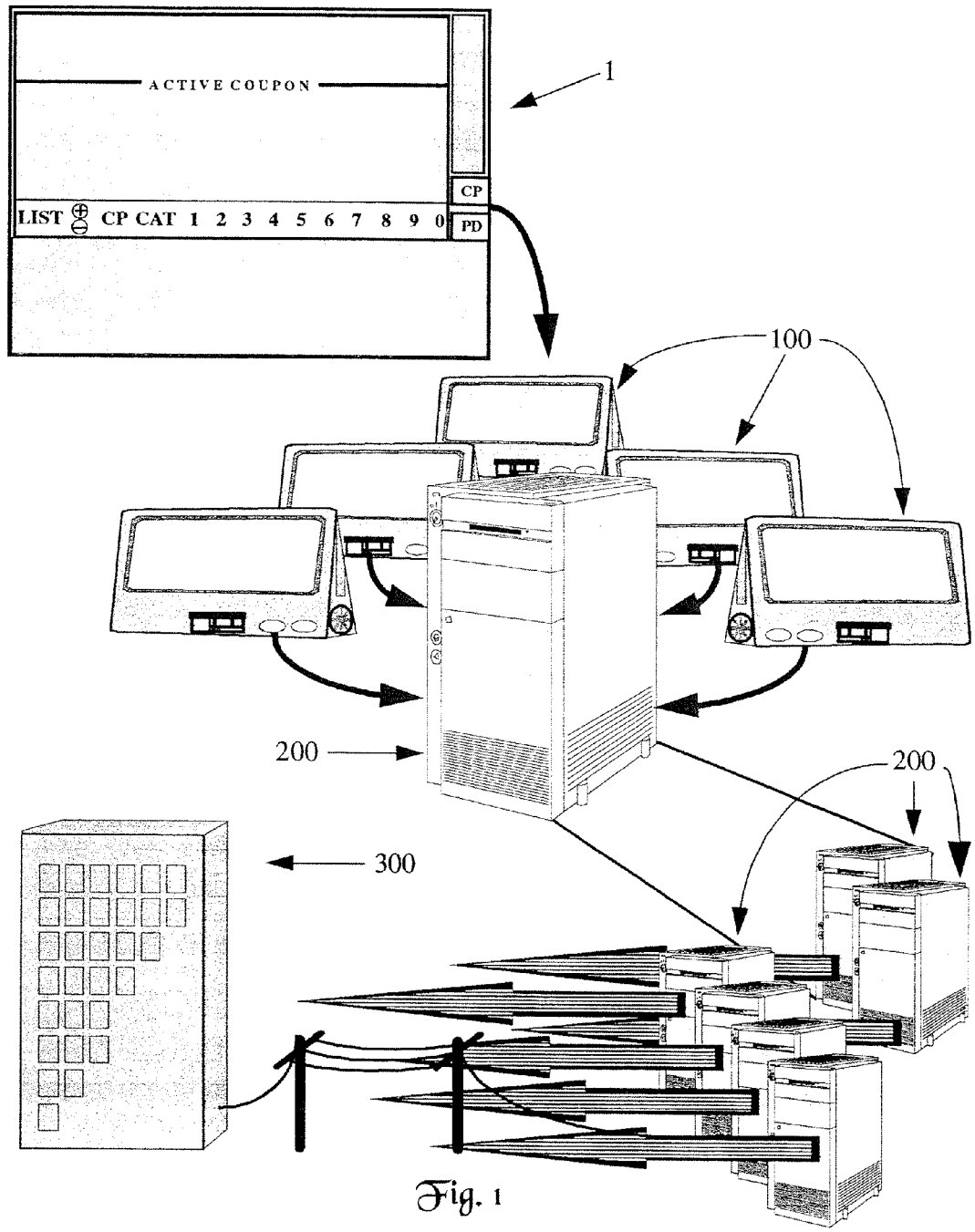
FIG. 1 is graphical representation of the coupon redemption system of the present invention.
Figure 2:
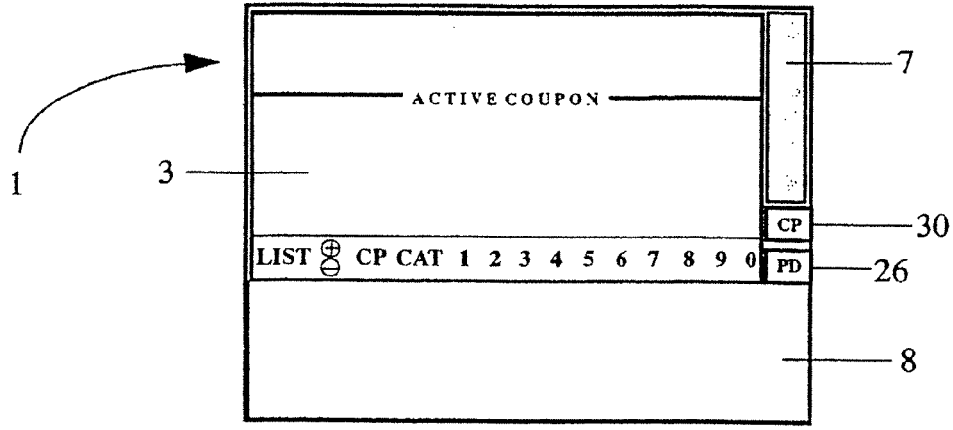
FIG. 2 is a front view of the coupon card of the present invention.

Viewing FIG. 1, the system for the electronic storage and redemption of coupons of the present invention generally includes a coupon card 1, at least one periphery device 100, a server computer 200, and a clearinghouse 300. Turning to coupon card 1, FIGS. 2-4b more specifically illustrate the components of coupon card 1 which are visible on the outer surfaces of the card. The front of coupon card 1 includes a liquid crystal display (LCD) screen 3 from which the user may view information related to coupon bar codes that have been entered into coupon card 1 (see FIG. 4b for example displayed coupon information). While a preferred embodiment shows a LCD screen, the present invention is intended to include any other suitable display device, such as an active matrix, passive matrix or any other type of LCD or such as a gas plasma display panel. In the embodiment shown, display screen 3 will include date/time indicator 4, low battery indicator 5 and will display various messages used to prompt and instruct the user during operation of the coupon card 1. A solar panel 7 is positioned adjacent to display screen 3 and will serve to contribute power to coupon card 1, thereby preserving the life of the batteries which are the main source of power for this embodiment of coupon card 1. A cover 8 will fold over a lower section of coupon card 1 and fold open to reveal the operational keys as seen in FIG. 4a and explained in greater detail below. In a preferred embodiment, the height and width of coupon card 1 will approximate that of a conventional credit card. Ideally, the thickness of coupon card 1 will be minimized to enable coupon card 1 to be carried in credit card pockets of conventional wallets.

Figure 3:
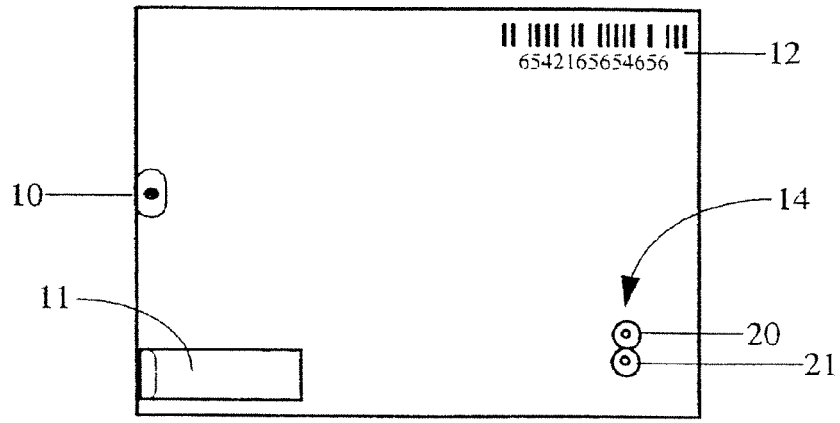
FIG. 3 is a back view of the coupon card of the present invention.
Figure 4A:
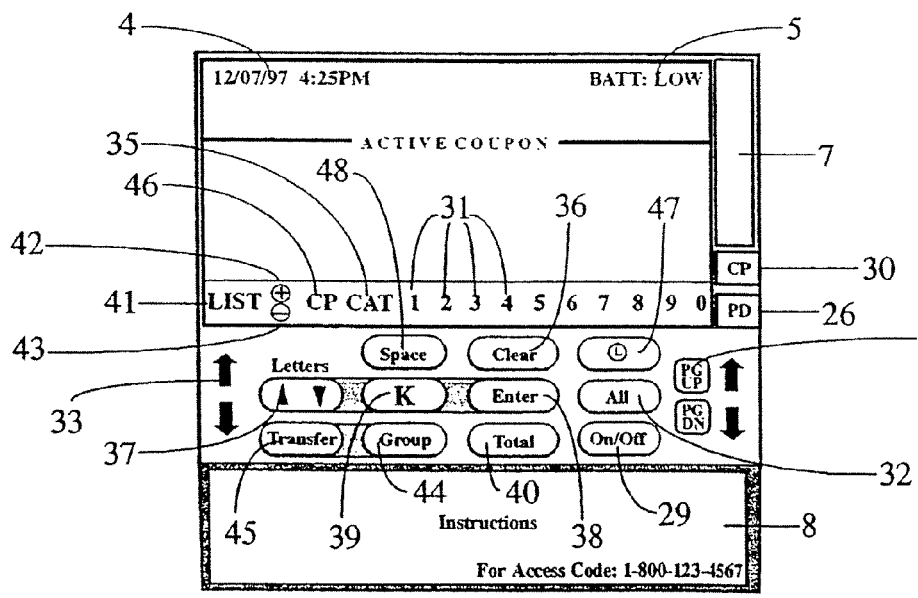
FIG. 4a is a front view of the coupon card illustrating operational keys.

The back side of coupon card 1 is illustrated in FIG. 3. This figure shows the lens of the optic scanner 10 which will serve to enter bar codes into coupon card 1 by scanning the bar codes printed on coupons or to perform certain other operations discussed below, including scanning bar codes on product packaging. While scanner 10 is described as an optic scanner, it is envisioned that scanner 10 could also be a laser scanner. Also shown is battery compartment 11 and coupon card identifier bar code and numeric equivalent 12. A separate coupon card identifier bar code 12 and numeric equivalent will be placed on each coupon card 1. It is intended that the provider of the coupon card services will require registration of the coupon card owner. Therefore, when coupon card 1 interfaces with periphery device 100, the card identifier bar code 12 and numeric equivalent may be associated with card owner data maintained in a clearinghouse 300 database. This allows clearinghouse 300 to perform various information gathering functions such as compiling consumer micromarketing data (CMD) or issuing instant rebates (both of which are described in greater detail below). Another benefit of associating the coupon card 1 with its user will be to insure the coupon card user complies with his contractual obligations to the provider of the coupon card services. All coupon cards will require an initial access code to be entered into coupon card 1 by numeric keys 31 to begin operation and subsequent periodic access codes to continue operation. The access code will be supplied by the coupon card service provider. If the access code is not supplied to the user (for example, because the user has not fulfilled his contractual obligations), the coupon card will become disabled. However, the disabling will not cause the coupons stored in the coupon card 1 to be lost and these may be used again as soon as the new access code is entered into coupon card 1 using numeric keys 31. However, the access code and identifying number are not strictly necessary to the basic coupon redeeming functions of coupon card 1 and could be deleted from an alternative embodiment of coupon card 1.

Figure 5:
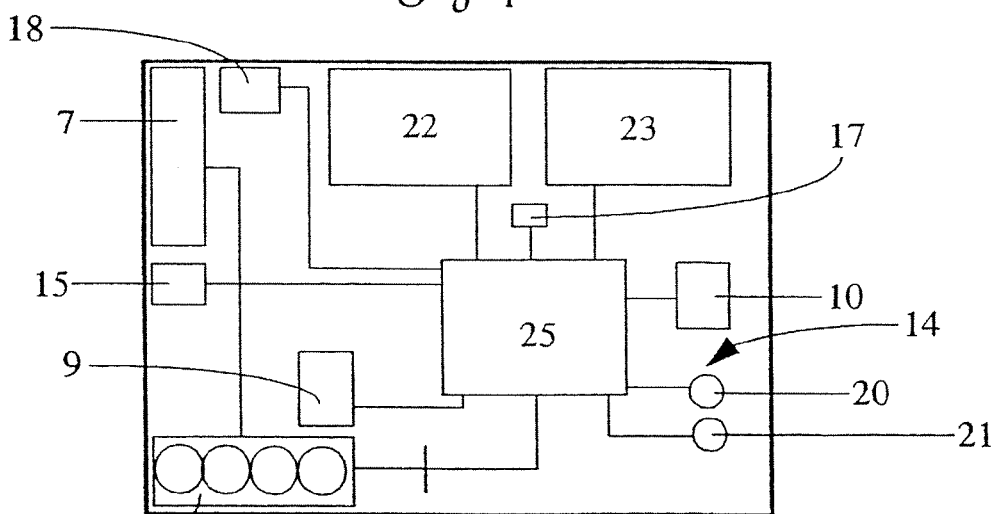
FIG. 5 is a schematic diagram of the major internal components of the coupon card.

Communications port 14 is found on the back side of coupon card 1. In the embodiment shown, communications port 14 comprises a light coupling device having a light emitting diode 20 and a light responsive transistor 21. However, it is envisioned that communications port 14 could be any device for transmitting data that could carry out the functional requirements of the present invention. Such alternative communications ports may include serial bidirectional data ports, infrared transceiver devices, magnetic disk writing devices or a laser transmit-receive interface like those found on CDROM drives. FIG. 5 is a schematic diagram further illustrating various components of coupon card 1. Scanner 10 and communications port 14 are electrically connected to microprocessor 25. It will be understood that the term "microprocessor" is intended to include any type of processor or controller which can carry out the functional requirements of the present invention. A random access memory (RAM) means 23 will be connected to microprocessor 25 in order to receive and store bar codes and bar code related information as discussed below. A read only memory (ROM) means 22 will be connected to microprocessor 25 and will hold various operating routines described in more detail below. As used herein, RAM means and ROM means are intended to include any conventional random access memory device or read only memory device respectively. In place of ROM means 22 the present invention could also employ an erasable programmable read only memory (EPROM) or other similar means. An alternative power saving memory means could also be a fast read-slow write EPROM using a fast write buffer interface. This memory means is capable of disconnecting itself from the power source and "floating" for a period of time without being utilized. Additionally, this memory means could be coupled with a refreshing mechanism to "recharge" the memory weekly during long periods of non-use of coupon card 1. A similar function could be carried out by a memory means that turns microprocessor 25 on at regular intervals.

Microprocessor 25 will also be connected to display screen 3 by way of a display feed 17 and to audio signal device 18. While for simplicity battery compartment 11 is not shown connected to each component of coupon card 1, it will be understood that the batteries in compartment 11 will supply power to the various components of coupon card 1 as needed. The batteries may be lithium batteries, nickel-cadmium batteries, alkaline batteries, or any other suitable type of batteries. Battery compartment 11 will provide for a plurality of batteries with all but one of the batteries being removable. The permanent battery will insure that when batteries are being replaced, one battery always remains in coupon card 1. In this manner there can never be a total lack of power in the system, an event which would cause a loss of data stored in RAM means 23. Of course, a less preferred embodiment could have all removable batteries, which would require the coupon card user to take care not to remove all batteries at the same time. While the primary function of light responsive transistor 21 mentioned above is to receive data, it will be possible for the continuous transmission of light to transistor 21 to perform a battery recharging function. In the event that the information shown on display screen 3 cannot be read by a visually impaired user, an alternate embodiment of coupon card 1 will also have a voice chip 9 as illustrated in FIG. 5. Voice chip 9 will convert the written information on display 3 into verbal information. FIG. 5 also shows a radio frequency receiver 15 which will be explained in an embodiment discussed below. FIG. 4a illustrates a "Time" key 47, which is used to alter the date and time indicator 4. Each depression of key 47 will place a separate segment of the date (e.g. the month, day or year) and time (e.g. hours, minutes or am/pm) indicator 4 in a mode which allows setting of the date or time. The scrolling keys 33 are then used to select a particular value for the date or time segment under operation. Pressing "Clear" key 36 will end the date/time altering function.

The entry of the bar code or UPC number by itself into coupon card 1 does not always provide coupon card 1 with sufficient information to represent to the user what product the bar code represents. In addition to the bar code, coupon card 1 must contain coupon redemption requirement data which will provide additional information such as what product is represented by the coupon. Redemption requirement data will generally consist of the pertinent information that appeared on the original printed coupon such as the product's brand name, the required size, number or combination of items required to redeem the coupon, the expiration date, and the discount amount of the coupon (including whether the coupon entitles the holder to a free product). In cases where the manufacturer makes redemption requirement data available prior to issuance of coupon card 1, this data may be entered into the RAM means 23 of coupon card 1 prior to the card being issued to the user. However, as manufacturers publish new coupons, redemption requirement data will be periodically updated and supplemented. This additional redemption requirement data will be entered onto coupon card 1 by use of a periphery device 100 as discussed below.

When a bar code or redemption requirement data is entered into coupon card 1, it will be stored in a record having numerous fields for storing bar codes, redemption requirement data, and numerous other items of data such as category markers or raincheck markers discussed below. It will be understood that many of the functions described below will be carried out by placing a particular marker in the coupon record. Another notable marker will be one indicating the distribution channel of the coupon such as whether the coupon was distributed through a dispenser, a pager system, or the Internet, all of which will be explained below. This record will generally be referred to as a "coupon record" or "coupon data". For simplicity, coupon records containing only bar codes and no corresponding redemption requirement data may be referred to as only "bar codes". Similarly, coupon records containing only redemption requirement data without corresponding bar codes will be referred to as only "redemption requirement data".

The entering of coupon bar codes into coupon card 1 and the subsequent manipulation of the bar codes and other data will be carried out by operational keys prompting microprocessor 25 to execute various sorting routines. The operational keys of one embodiment are illustrated in FIG. 4a and it will be understood that the following description of operational keys is in reference to that Figure. FIGS. 7a-9 are flow charts illustrating the processing steps carried out by microprocessor 25. Where processing steps are discussed in conjunction with the pressing of operational keys, the discussion of processing steps is made with reference to FIGS. 7a-9.

After the user has opened cover 8 to access the operational keys, he will turn on coupon card 1 with "On\Off" key 29. Coupon card 1 will also have an automatic turn off routine. If no operational keys are pressed, scanning performed or other operations executed for a given period of time, microprocessor 25 will execute an off command and return coupon card 1 to the off status. Once power is supplied to coupon card 1, microprocessor 25 will display a start-up file which includes the date and time as seen in process steps 60 and 61. The start-up up file may include a routine which will initially display coupons of particular interest to the user. Coupons of particular interest could include coupons for "new" products or coupons which will shortly expire. The date which will be used during the start-up routine to determine what coupons are about expire will be loaded onto coupon card 1 by periphery device 100 as discussed below.

Figure 6:
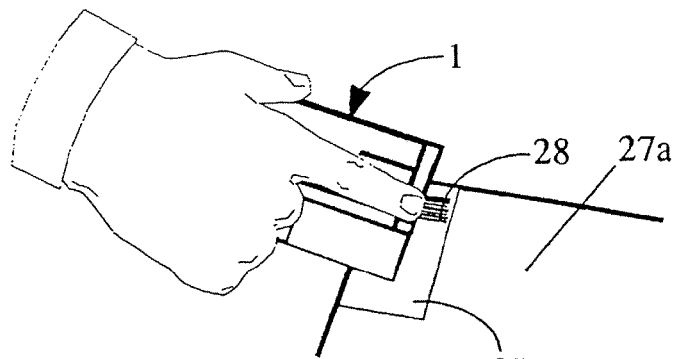
FIG. 6 is an illustration of the coupon card scanning in a bar code on a coupon.
Figure 7A:
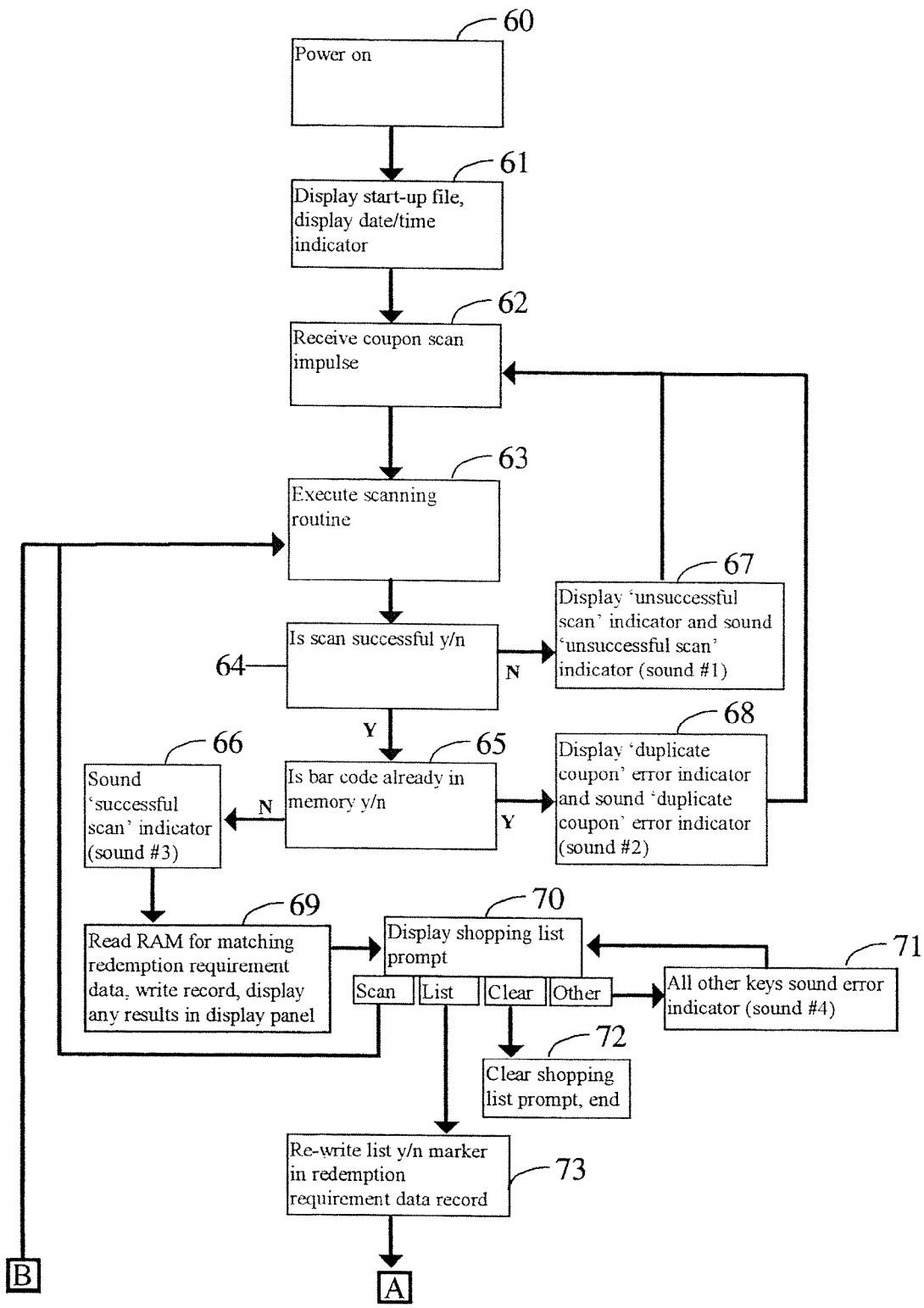
FIGS. 7a and 7b are flow charts of the process steps for entering coupon bar codes into the coupon card of the present invention.
Figure 7B:
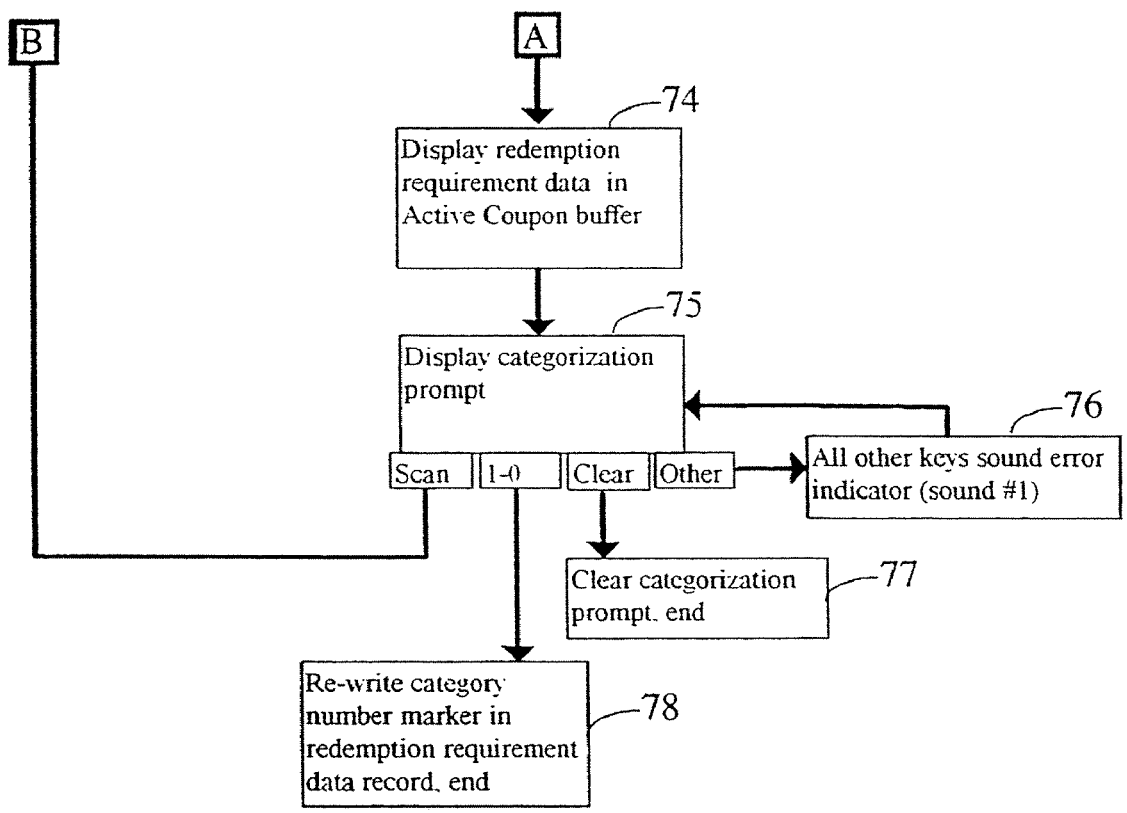
Figure 8:
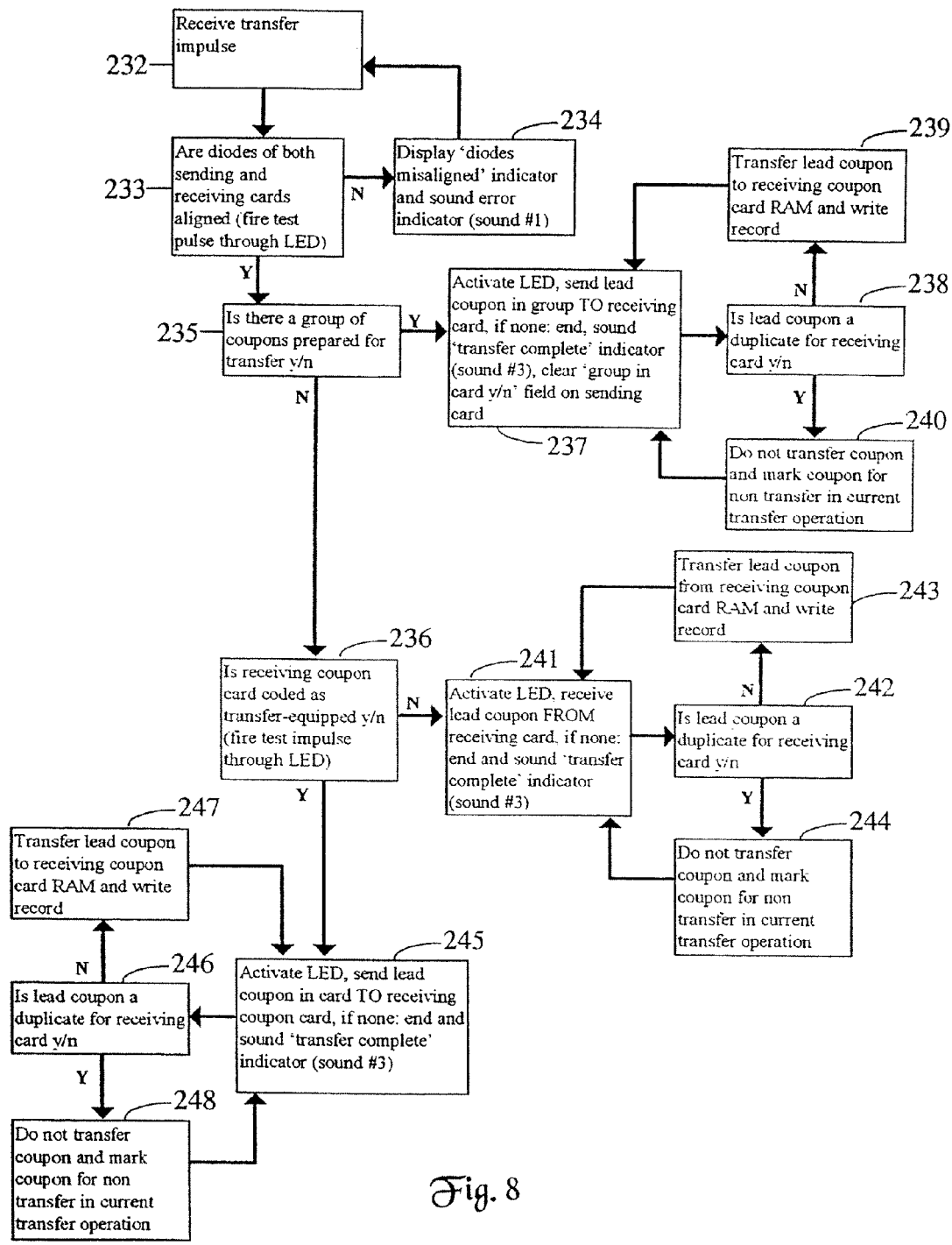
FIG. 8 is a flow chart of the process steps for transferring coupon data from one coupon card to another.
Figure 9:
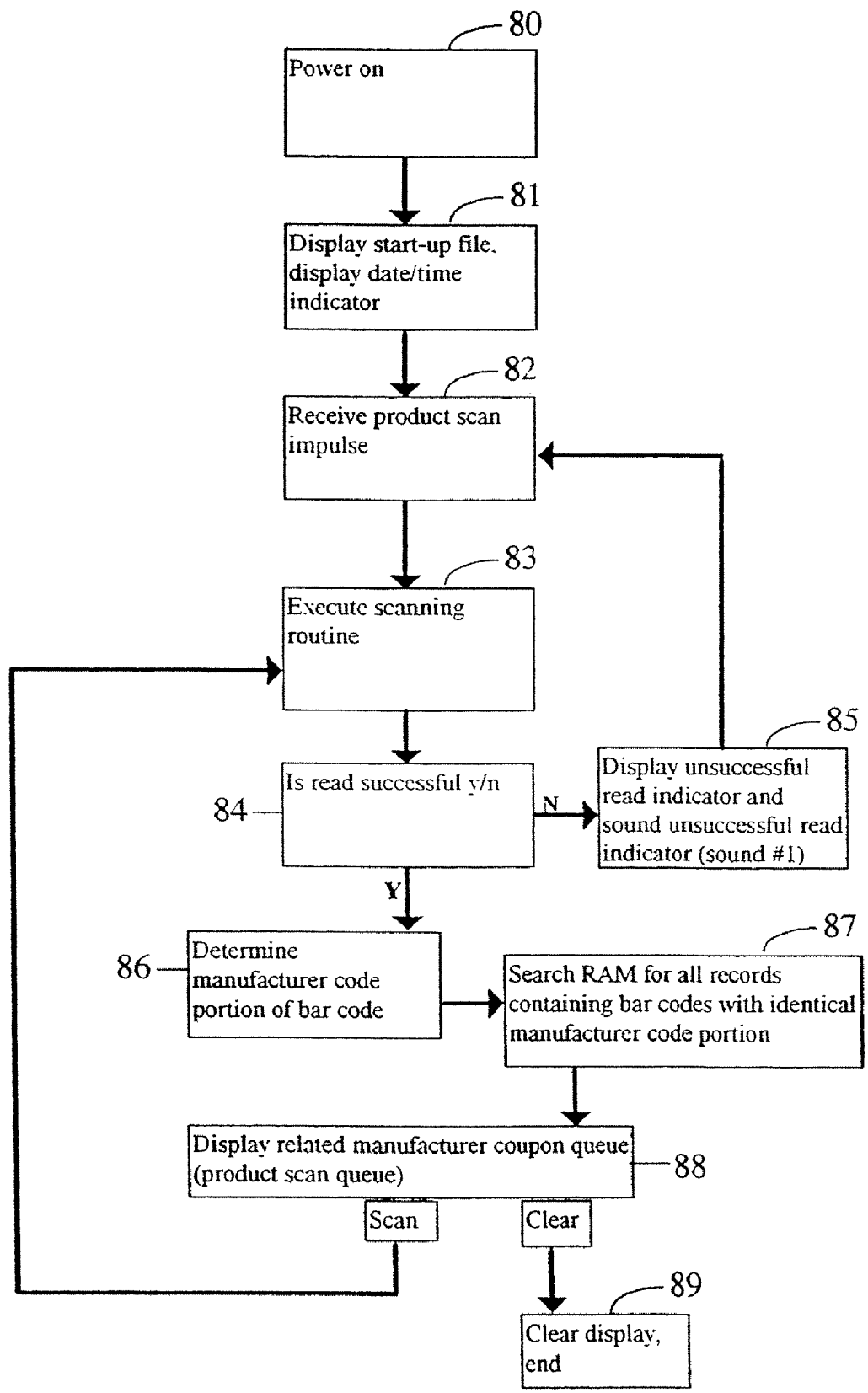
FIG. 9 is a flow chart of the process steps for entering product bar codes into the coupon card of the present invention.

To scan a coupon bar code into coupon card 1, the user will press coupon scan "CP" key 30 and pass scanner 10 (see FIG. 6) over a bar code 28 on coupon 27 on any printed media 27*a*. Pressing "CP" key 30 will send a scan impulse to microprocessor 25 and initiate the scan routine as shown by process steps 62 and 63. If the bar code is successfully entered into the RAM means 23 and the bar code is not already in RAM means 23, microprocessor 25 will display "SUCCESSFUL SCAN" or a similar message on display screen 3 and sound the audio signal device 18 to indicate the scan was successful as seen in process steps 64-66. If the bar code is not successfully read, process step 67 is executed with an unsuccessful scan display and sound indicator and the routine will return to process step 62 to await another scan impulse. If the bar code has previously been scanned into the memory of coupon card 1, process step 68 will display "COUPON IN MEMORY" or a similar message on display screen 3 and will produce a negative scan sound and return to process step 62 to await another scan impulse. In the situation where the coupon only has a UPC number and no bar code, the coupon may still be entered by way of manual coupon entry "CP" key 46 (seen in FIG. 4*a*). By pressing "CP" key 46 followed by the numeric keys 31 corresponding to the UPC code and the "CP" key 46 again, the equivalent data as taken from bar codes will be entered into coupon card 1 and the routine begins execution at step 64. Where "scanning" a bar code is discussed below, it will be understood that manual entry of the UPC code by "CP" key 46 is considered the equivalent function.

Figure 4B:
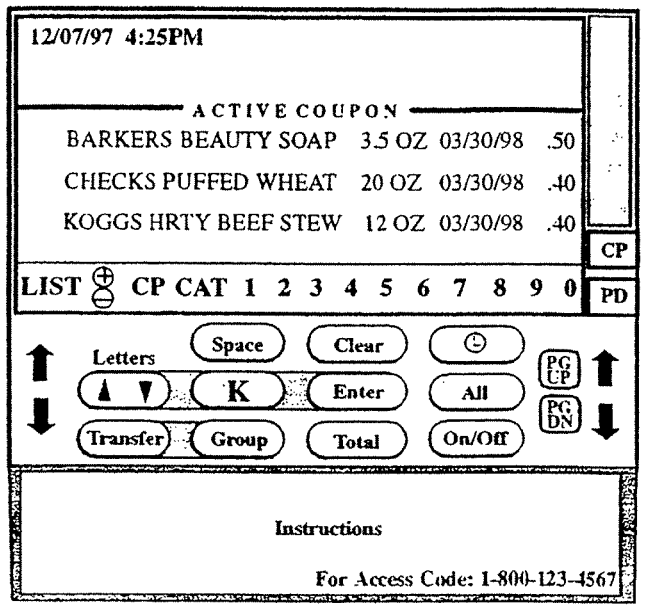
FIG. 4b is a front view of the coupon card illustrating coupon data on the display screen.

Once a bar code has been successfully read as in process step 66, a day counter marker will automatically be attached to the record containing the bar code. This day counter marker will assist in tracking and removing out-of-date coupon bar codes as described below. Process step 69 will then search RAM means 23 for coupon redemption requirement data which corresponds to the bar code.

Where process step 69 finds the bar code which corresponds to redemption requirement data, the redemption requirement data for that coupon will be displayed on display screen 3 seen in FIG. 4*b*. An alternative method of displaying coupon related data on screen 3 could be used if coupon card 1 was equipped with Video RAM. Such an embodiment would allow a graphics display to approximate the actual look of the coupon. The graphics display could be incorporated into the coupon record as another marker. A "Graphics" key (not shown) could allow a user to toggle between a graphics mode and the text mode.

Process step 70 will then display a prompt inquiring whether the user desires to put the coupon in a shopping list. The user may press "List" key 41 to enter the coupon in the shopping list described below. Alternatively "CP" key 30 (or "CP" key 46) may be pressed which returns the user to process step 62 to scan or otherwise enter another bar code; the "Clear" key 36 may be pressed to clear display screen 3 and end the bar scan routine; or pressing any other key will sound an error signal (step 71) and redisplay the shopping list prompt (step 70). If "List" key 41 was selected after process step 70, process step 73 will rewrite the record containing redemption requirement data to include a shopping list marker. This marker will allow the record to be eventually stored in a shopping list file and accessed later by the coupon card user. Next the record will be displayed in the active buffer ("Active Coupon" area of display screen 3) and a categorization prompt will be displayed as in process steps 74 and 75. If the user presses a numeric key 31, process step 78 will rewrite into the record appearing in the buffer area a marker corresponding to the chosen category number. The category number marker will allow that record to be associated with a particular category in future operations. If the user does not wish to categorize the redemption requirement data, he may press "Clear" key 36 to clear categorization prompt and end the routine or he may press "CP" key 30 (or "CP" key 46) to scan or otherwise enter another bar code. Pressing any other key results in an error sound by audio signal emitter 18 and returns the user to the categorization prompt (step 75).

The use of the operational keys to execute conventional sub-routines allows the coupon records to be viewed and manipulated in any number of ways. For example, by pressing the "All" key 32, all coupon records will be viewable on display screen 3 in an alphabetically descending format. The user will be able to scroll through the list of coupon records by way of line scrolling keys 33 or page scrolling keys 34.

The present invention also contemplates employing routines that allow microprocessor 25 to associate coupon records with particular categories after the coupon records have been written to RAM 23. Such a routine will begin by allowing the user to move (e.g. by the scrolling method described above) a coupon into a buffer for subsequent operations. As mentioned, the buffer area is represented by the "Active Coupon" area of display screen 3 as seen in FIG. 4*a*. The user then presses the "CAT" key 35 followed by the numeric keys 31 corresponding to any one of the categories 1-0 to associate the chosen coupon record data with that category. When the coupon record has been categorized, a category indicator will appear next to the coupon record when it is displayed. Similarly, to view a particular category of coupons, the user insures there is no coupon text in the "Active Coupon" area of screen 3; if there is a coupon record in this area, the user will press the "Clear" key 36 which will remove the coupon record from the buffer. The user then presses "CAT" key 35 followed by 1-0 on numeric keys 31 and then "All" key 32. This sequence of commands will execute a routine which displays all coupons in the respective category in an alphabetically descending format.

Another routine will be provided to allow user viewing of all coupon records beginning with a selected letter of the alphabet. Generally, this letter will correspond with the first letter in the brand or manufacturer name of the product. Each time the user presses the "Letters" key 37, a letter of the alphabet will appear sequentially in a miniature display panel 39. When the desired letter appears in display 39, pressing the "Enter" key 38 will prompt microprocessor 25 to display on screen 3 all coupon records beginning with the chosen letter. The same routine may use multiple letters to identify products. By selecting a letter with the "Enter" key 38 and then repeating the steps for a second letter, all products whose spelling begins with those two letters will be displayed. It will be understood that this is a form of dynamic queue wherein further key strokes will further define the search of coupon records to form a more finite queue. An alternative to the alphabetic keying mechanism described above could be a complete alphabetic keypad.

As will be explained in more detail below, coupon card 1 will have stored in RAM means 23 the total amount of money saved by the redeeming of coupons with this system. A preferred embodiment of coupon card 1 will provide a routine which calculates the cumulative amount saved during: 1) the last shopping trip in which coupon card 1 was used, 2) the month to date, and 3) the year to date. This information will be displayed on screen 3 when the user presses "Total" key 40.

As mentioned above, a "shopping list" routine will further be provided in a preferred embodiment of the present invention. This routine will allow the user to segregate coupons for specific products that the user desires to purchase during a future shopping trip. There will be several ways the user may enter coupons into the "shopping list". First, immediately after the coupon has been scanned or otherwise entered in, the user may press the "List" key 41 and the coupon will be placed on the "shopping list". Alternatively, when a coupon is stored already in RAM means 23, the user may display the coupon in the "Active Coupon" area of screen 3 by any one of the methods described above. When the user presses the "+" key 42, the coupon will be added to the shopping list. Coupons will be removed from the "shopping list" by pressing "List" key 41 when no item occupies the "Active Coupon" area of screen 3. This will display the "shopping list". As the user scrolls through the "shopping list" as described above, the user can remove any item in the "Active Coupon" area by pressing the "−" key 43. While not shown in FIG. 4*a*, coupon card 1 could also be equipped with a "Move" key. If the coupon card user changes his residence, he may press the "Move" key and coupon card 1 will prompt him to enter (using the numeric keys 31 and "Letters" key 37) his new address and telephone number. The next time coupon card 1 is inserted into a periphery device 100, the user's new address and telephone number will be transmitted to the coupon card service provider through the server 200 (as explained below).

Another routine of coupon card 1 will allow transfer of coupon records between coupon cards 1 previously purchased to a more recently purchased coupon card 1. The user will first determine what coupon records will be transferred. Unless the user desires to transfer all coupons, he must place the coupons to be transferred into a selected group. This is accomplished by the user moving a coupon item to the "Active Coupon" area of screen 3 by any of the routines described above. The user then presses "Group" key 44 to place this coupon record in the "group" file. This procedure is continued until the user has placed all the coupon records to be transferred into the new file. The file may be reviewed by clearing the "Active Coupon" area of screen 3 and then pressing "Group" key 44. Having produced the display of the entire "group" file, coupon records can be selectively removed from the new "group" file by placing a "grouped" coupon record in the "Active Coupon" area and pressing "−" key 43. The entire new file could be erased by pressing "All" key 32 followed by "−" key 43, during the display of the group file.

Once the file of coupon records to be transferred is assembled, the two coupon cards will be placed back to back such that the light emitting diodes 20 of each coupon card 1 are aligned with the light responsive transistor 21 of the other coupon card 1. Next, on the coupon card 1 transferring the coupon records, the user will press "Group" key 44 followed by "Transfer" key 45. The transferring coupon card 1 generally will request confirmation of the transfer which will require the user to press the "Transfer" key 45 a second time and the transfer will be executed. As seen in the flow chart of FIG. 8, a transfer routine represented by steps 232-248 will be executed upon the pressing of "Transfer" key 45. Initially, it will be determined if the light emitting diodes 20 and the light responsive transistors 21 are aligned on the respective coupon cards 1 by firing test pulses through the light emitting diodes. If the diodes are not aligned, an appropriate indicator will appear on display screen 3 (step 234). When it is confirmed that the light emitting diodes of the coupon cards 1 are aligned, the routine will first determine if a group of coupons have been segregated for transfer in the sending coupon card 1 (step 235). If a group has been created, the sub-routine illustrated in steps 237-240 will be executed. The sub-routine will compare the lead coupon record in the group listing to the existing coupon records in the receiving coupon card 1 (step 238). If the coupon record does not exist in the receiving coupon card 1, the coupon record will be transmitted to the RAM means 23 of the receiving coupon card 1 (step 239). If the coupon record does exist in receiving coupon card 1, the record is marked for non-transfer and not transmitted (step 240). This process will continue until all transfer-marked coupon records are transmitted whereupon an appropriate "transfer complete" signal will be displayed on screen 3 of the sending coupon card 1 (step 237).

Alternatively, the entire contents of coupon card 1 may be transferred by pressing "Transfer" key 45 if the sending coupon card 1 has no group. The user will again be prompted to press the "Transfer" key 45 a second time as confirmation of the operation before the transfer will be executed. Since a group of coupon records has not been segregated for transfer, step 236 will determine whether or not the receiving coupon card 1 is a transfer-equipped coupon card 1 (it is envisioned that initial models of coupon cards 1 may not have transfer function key). If the receiving card is not transfer-equipped (does not have a transfer key), then coupon card 1, which would send coupon records to another transfer-equipped coupon card 1, will instead receive the coupon records from the non-transfer-equipped coupon card 1. The sub-routine seen in steps 241-244 will cause the transfer-equipped coupon card 1 to send a signal through light emitting diode 20 which will trigger the transmission of coupon records from non-transfer-equipped coupon card 1, which will transfer all coupon records in its RAM means 23 to the now receiving coupon card 1. As described above, the sub-routine will only transfer coupon records for which there is no identical coupon record already existing in the receiving coupon card. It will be understood from step 236 that if coupon card 1 is not transfer-equipped and the operation is that of a complete contents transfer, then steps 241-244 will only allow the non-transfer-equipped coupon card 1 to send its complete contents of coupon records rather than receive them. In the case where the transfer is taking place between two transfer-equipped coupon cards, then the transfer will be completed by a sub-routine seen in steps 245-248, which are substantially the same as steps 237-240.

Coupon card 1 provides an additional function which will allow the user to scan the bar code on a product (as opposed to a coupon bar code) and determine if coupon card 1 contains any coupons provided by the manufacturer of the product. Of course, one advantage of this function is that it can be used to scan product bar codes in the supermarket, at home or anywhere else. As seen in the flow chart of FIG. 9, after the coupon card has been turned on and has displayed the start-up file, the user may press the product scan or "PD" key 26 (seen in FIG. 4*a*) and initiate the routine in steps 83-89. While holding "PD" key 26 down, coupon card 1 is positioned to scan the bar code on the product. If the scan is successful, the routine locates the manufacturer identifier portion of the product bar code. Since each coupon bar code will also contain a manufacturer identifier portion, the routine may compare the manufacturer code from the product bar code to determine if there are any coupons in the RAM 23 of coupon card 1 which were provided by the same manufacturer. As seen in step 88, the routine then displays on screen 3 all coupons that are provided by that manufacturer. The user can then scroll through the list to determine if he has a coupon corresponding to the exact product of interest.

Figure 10:
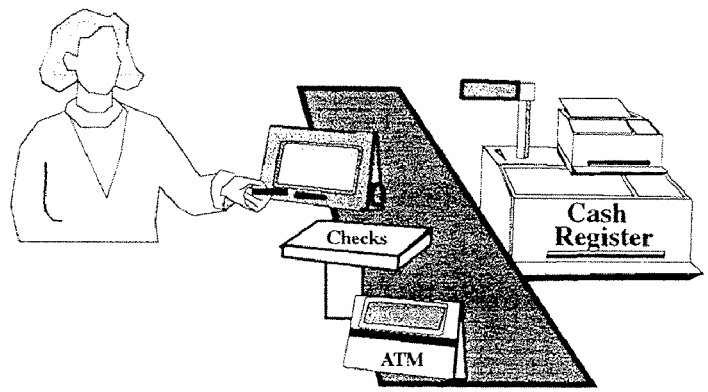
FIG. 10 is a representation of the typical location in a store of the periphery device of the present invention.
Figure 13:
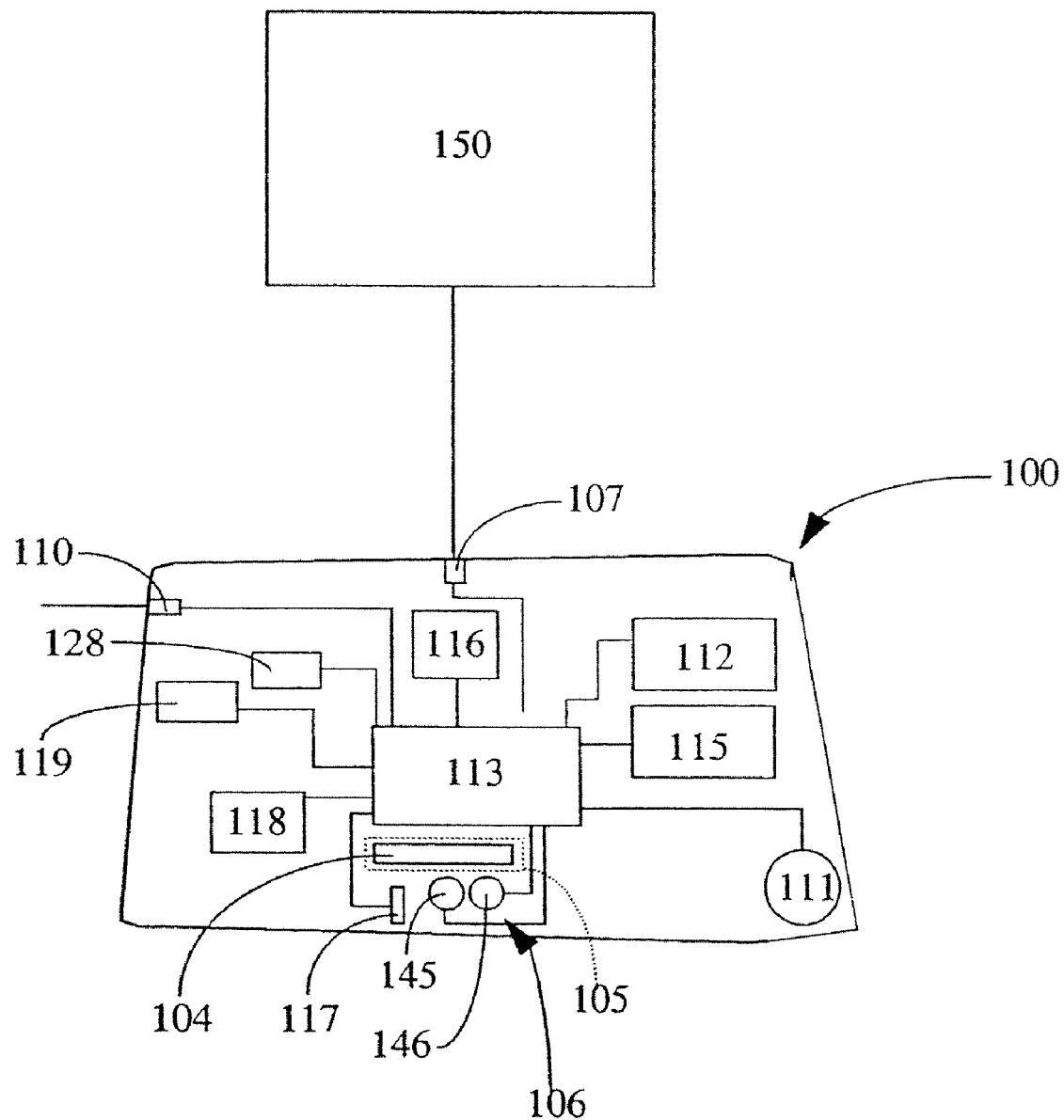
FIG. 13 is a schematic view illustrating the main internal components of the periphery device of the present invention.

While coupon card 1 allows the user to electronically store and organize coupons, a second element of the present invention is needed to redeem the coupons. This second element is the coupon card cashier periphery or periphery device 100. As seen in FIG. 10, periphery device 100 will be positioned at the customer check-out stand in the vicinity of cash register 150. Cash register 150 will be of a conventional type such as manufactured by IBM or NCR that registers a purchased item by receiving bar codes from a conventional bar code scanner interfacing with cash register 150. While two examples of cash register 150 could be an IBM model 4680 or model 4690, periphery device 100 is intended to be compatible with any type of cash register capable of carrying out conventional cash register functions. The bar code on the purchased item allows the cash register to identify and enter into its memory information such as the item's brand, size and retail price. This information is referred to herein as "purchase data". As seen schematically in FIG. 13, periphery device 100 will have a communications port 107 which will typically be a conventional serial port with a serial to parallel converter which will allow the transfer of purchase data from cash register 150 to the transaction buffer 116 under the control of microprocessor 113. Transaction buffer 116 will store the purchase data during the operations carried out by periphery device 100. Periphery device 100 will also include a ROM means 115 from which microprocessor 113 will read the numerous routines explained below. The operating software of the periphery device 100 will allow it to read conventional bar code systems found on most coupons including Series 5, extended suffix, UCC/EAN 128 bar codes and D3 coupon bar codes where applicable.

Figure 11:
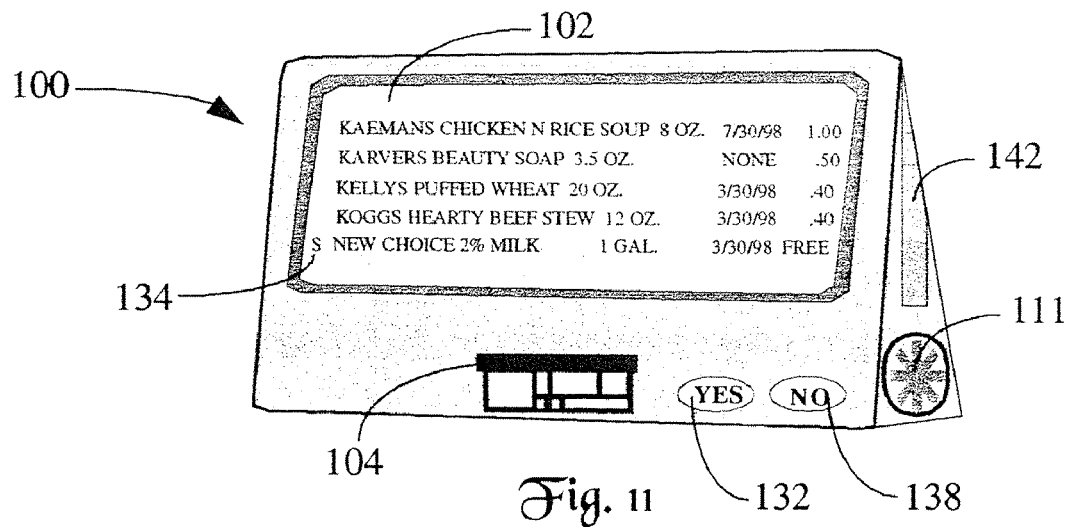
FIG. 11 is a front (customer's) view of the periphery device of the present invention.

In a preferred embodiment, periphery device 100 will appear as seen in FIG. 11. FIG. 11 illustrates the front side of periphery device 100 which will face the customer. This side of periphery device 100 will include a display screen 102 and a coupon card insertion port 104. Contained in insertion port 104 is a communications port 106 (not seen in FIG. 11) which will interface with the communications port 14 on coupon card 1. Communications port 106 is illustrated schematically in FIG. 13 and in that figure is a light coupling device having a light emitting diode 145 and a light responsive transistor 146. When coupon card 1 is inserted into insertion port 104, a seating mechanism 105 (shown schematically by dashed lines in FIG. 13) within periphery device 100 will grasp coupon card 1 and position it to insure that periphery device light responsive transistor 146 may receive signals from coupon card light emitting diode 20, and that coupon card 1's light responsive transistor 21 may receive signals from periphery device 100's light emitting diode 145. Any conventional seating mechanism, such as that found in automatic teller machines or computer disk drives, may be utilized. Adjacent to seating mechanism 105 will be bar code reader 117 which will read coupon card identification bar code 12 upon the insertion of coupon card 1 into insertion port 104. Periphery device 100 may also have a voice chip 119 and audio emitter device 128. Similarly, as discussed in conjunction with voice chip 9 of coupon card 1, voice chip 119 will allow information displayed on display screen 102 to be transmitted in verbal form for the visually impaired. Returning to FIG. 11, periphery device 100 will also have a separate bar code scanner 111 which may be used to scan in any paper coupons a customer possesses, but has not yet had the opportunity to scan into his coupon card 1. Furthermore, a channel 142 is shown on the side of periphery device 100. Channel 142 will allow attachment of a conventional "ten-key" pad for carrying out debit or credit card-related transactions in connection with a coupon dispenser to be explained below.

Figure 14A:
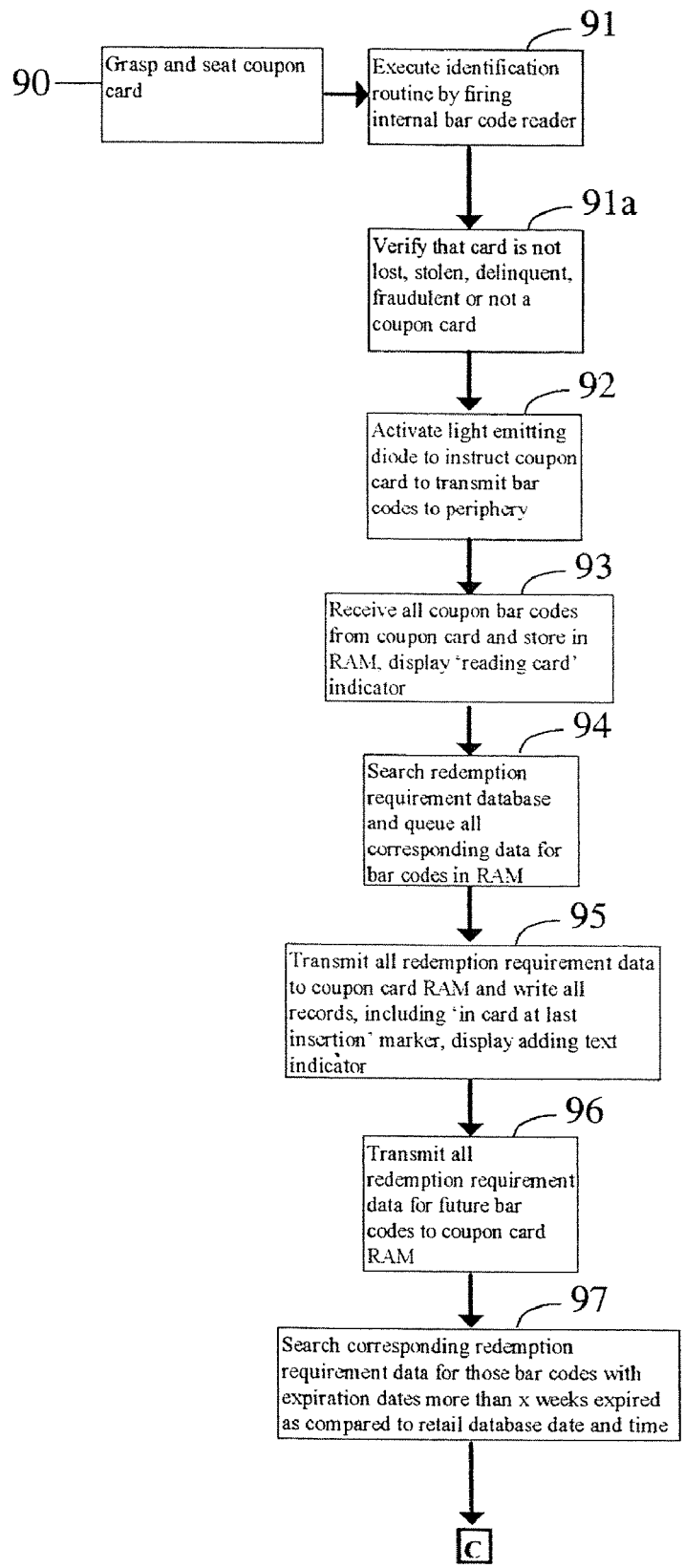
FIGS. 14a and 14b are flow charts of the process steps initially executed when the coupon card is entered into the periphery device of the present invention.

When coupon card 1 is inserted into periphery device 100, a routine will immediately commence several successive functions as represented in the flowchart of FIG. 14a. After periphery device 100 seats coupon card 1, it will execute an identification sub-routine which will direct the internal bar code reader to read the bar code identification number 12 of coupon card 1 as seen in process steps 90 and 91. Periphery device 100 will have access to information indicating if any card has been reported lost, stolen or delinquent (step 91a). If the card has been so reported, a disabling code will be entered onto coupon card 1 preventing any further operation (not shown in the flow charts). Next, the coupon card records are uploaded from coupon card 1 to periphery device 100, which will store these records in its RAM means 112 (process steps 92 and 93). While this is occurring, display screen 102 will indicate that periphery device 100 is reading coupon card 1 with the display of "READING CARD" or a similar message to the customer. Periphery device 100 then searches all redemption requirement data (i.e. records with redemption requirement data but no bar code) that is stored in it's RAM means 112 and queues the coupon records just received from coupon card 1 that correspond with the redemption requirement data (step 94).

In process step 95, all redemption requirement data in periphery device 100 is transmitted to RAM means 23 of coupon card 1, wherein all previously existing redemption requirement data in RAM means 23 is overwritten with the redemption requirement data of periphery device 100. Simultaneously, all records in coupon card 1 will be rewritten with an "in card at last insertion" marker. This marker will track how many times a record has been read by a periphery device without a coupon associated with that record being redeemed. In addition to redemption requirement data for existing coupons, redemption requirement data for coupons manufacturers will be publishing in the future will also be transmitted to RAM means 23 of coupon card 1 (step 96) while periphery device 100 displays an "ADDING TEXT" or similar message on display screen 102.

Figure 15A:
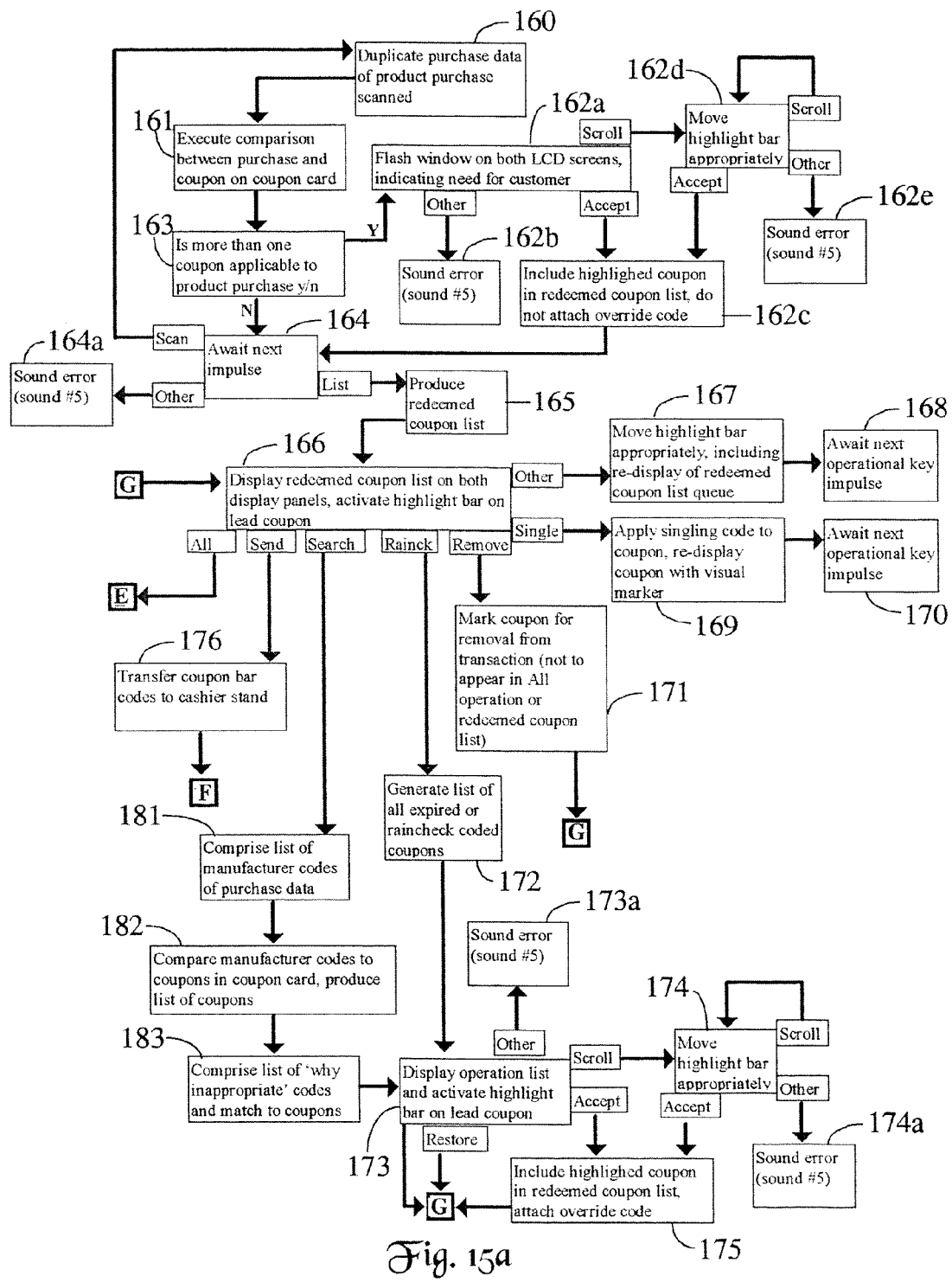
FIGS. 15a-15c are flow charts illustrating the process steps executed when the periphery device interfaces with a retail cash register.

In process steps 97 and 98, records having redemption requirement data and a corresponding bar code will be searched for any records with expiration dates that have been expired for more than a given time period and these records will be marked for overwriting. The routine will also search for coupon records having only bar codes which fulfill two criteria: the records will have had no corresponding redemption requirement data for more than a given time period; and coupon card 1 has been inserted into periphery device 100 more than a certain number of times while the record has been in coupon card 1. Any coupon records fulfilling these criteria will be marked for overwriting. The routine will then identify and queue all coupon records with redemption requirement data which also have a raincheck code in anticipation of a customer having purchased an item covered by a coupon that could not be used prior to the expiration date. Also, while not shown in FIG. 14a, periphery device 100 will also load the local time and date against which coupons are compared to determine expiration dates during the start-up procedure of coupon card 1. This date cannot be altered by the consumer. After all items being purchased are scanned into cash register 150, the coupon redemption process is continued as indicated by the flow chart seen in FIG. 15a-15c. The purchase data from the cash register 150 will be copied to periphery device 100's transaction buffer 116 and compared to the coupon records uploaded from coupon card 1 as indicated by steps 160 and 161. If more than one coupon is applicable to an item purchased, a subroutine seen in steps 162*a*-162*e* will be executed. In this subroutine, a message on display screens 102 and 109 will inform the customer and cashier that there is more than one applicable coupon for a product and prompt them to select which coupon they wish to redeem (step 162*a*). The cashier at the customer's direction may then scroll through the list of redeemable coupons (step 162*d*) and press the "Accept" key 126 to indicate which coupon will be redeemed (step 162*c*). The selected coupon will then be included in the list of redeemed coupons discussed below.

Figure 12:
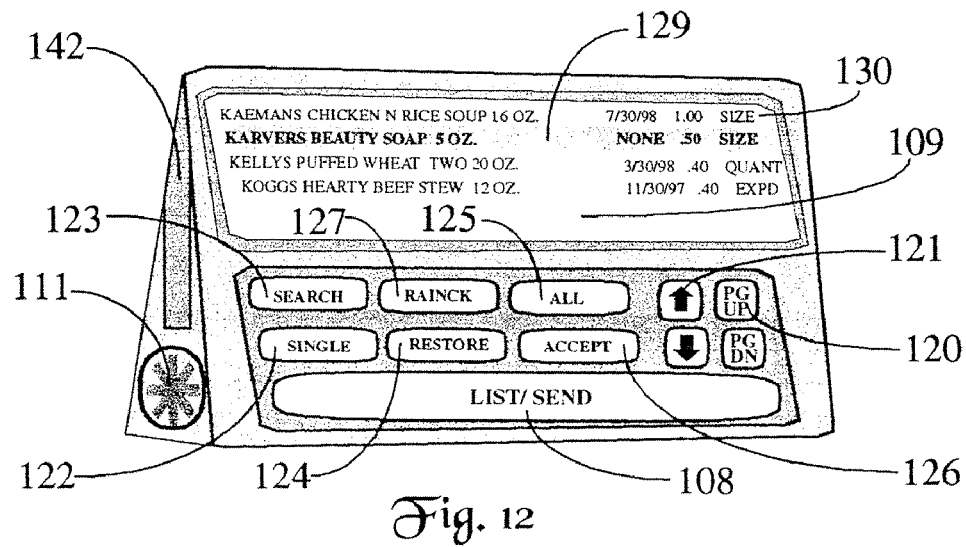
FIG. 12 is a rear (cashier's) view of the periphery device of the present invention.
Figure 14B:
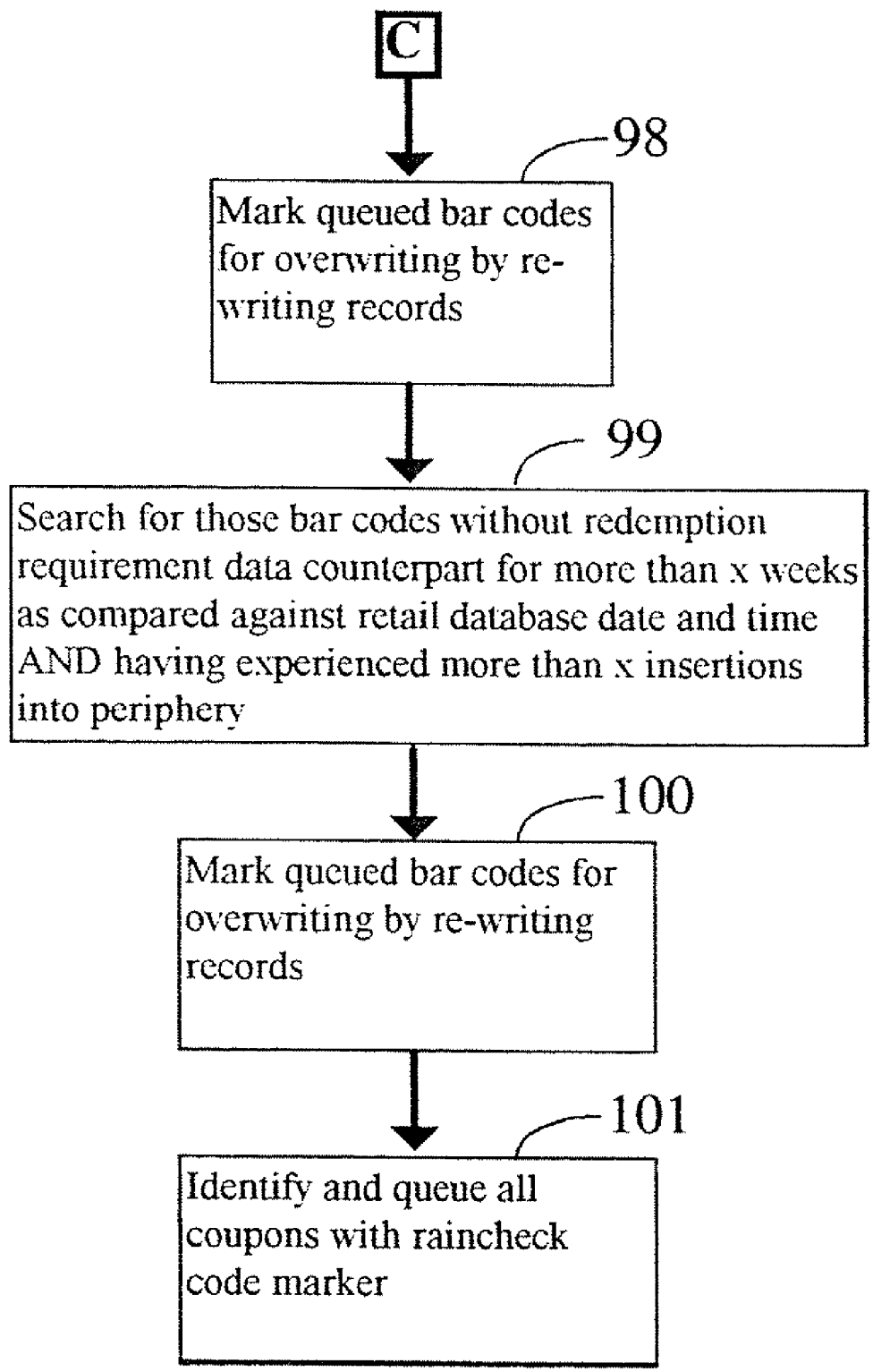

After execution of the subroutine shown in steps 162*a*-162*d*, periphery device 100 will await the cashier's pressing of the operational keys seen in FIG. 12 to continue the redemption process. When "List/Send" key 108 is pressed, all coupons for which there is a corresponding purchased item will be displayed. If the coupon card is inserted into the periphery after all products have been scanned, then the subroutines represented by process steps 90-101 (FIGS. 14*a* and 14*b*) and steps 160-164 above will be carried out by the execution of step 165 when the "List/Send" key 108 is pressed. As illustrated in FIGS. 11 and 12, the matching coupons are simultaneously displayed to the customer on display screen 102 and the cashier on display screen 109. The operational keys on the cashier's side of periphery device 100 will allow the cashier to execute multiple routines to expedite the redemption process and insure customer satisfaction. As seen in FIG. 12, a highlight bar 129 controlled by page scrolling keys 120 and line scrolling keys 121 will allow the cashier to identify individual coupon records for further processing.

Figure 15B:
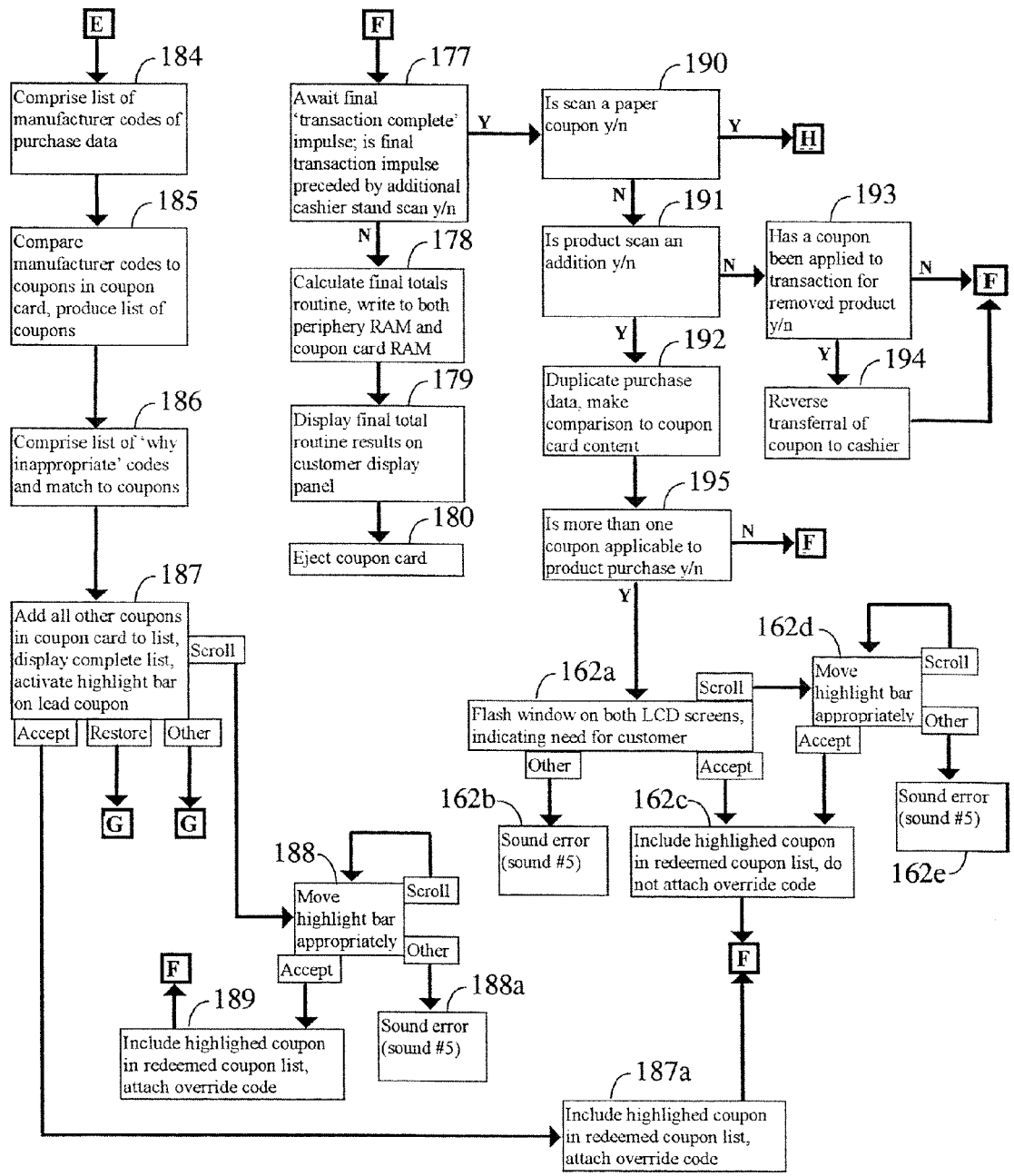
Figure 15C:
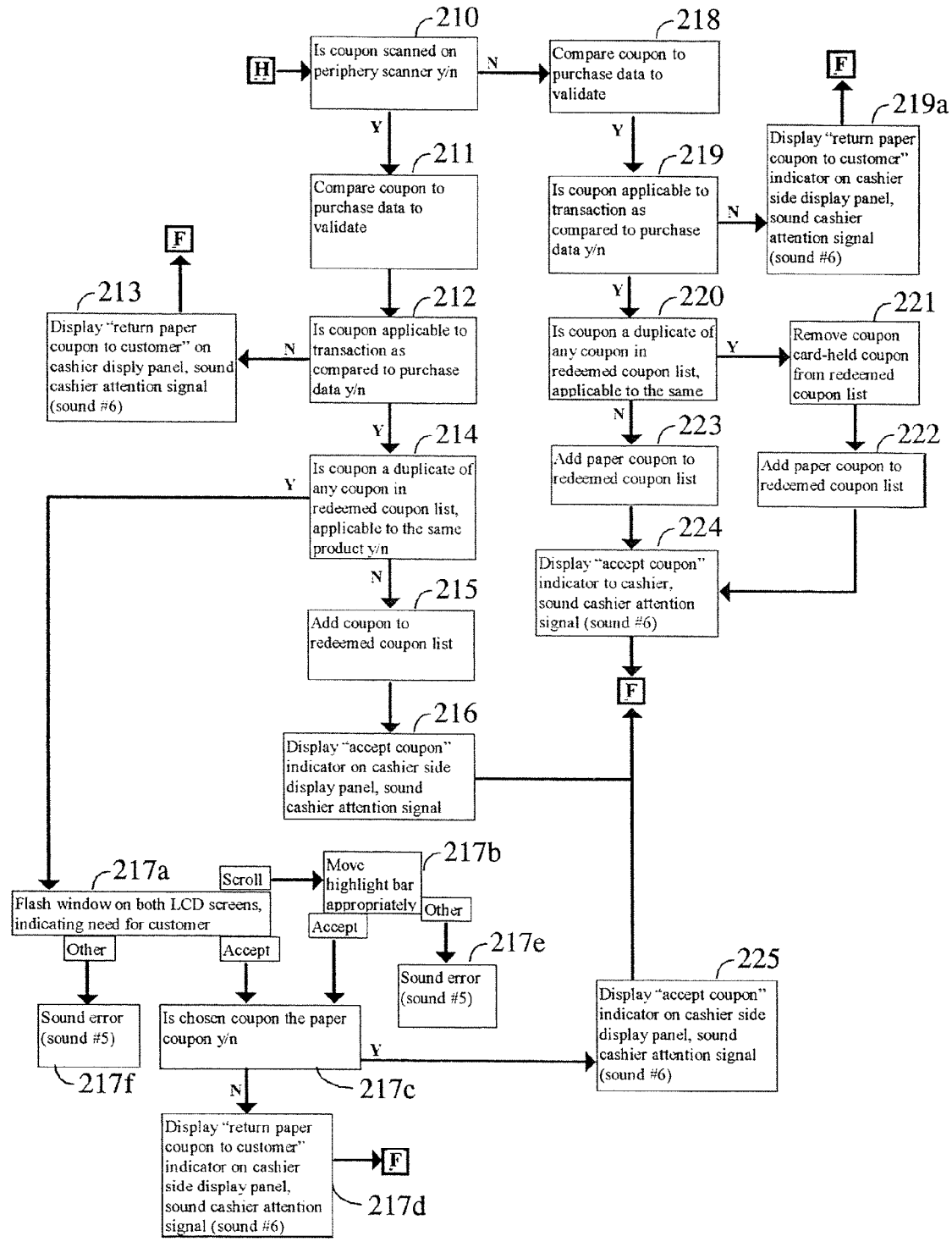

If the customer is satisfied that display screen 102 shows all his redeemable coupons, the cashier will again press the "List/Send" key 108 and the redeemable coupon bar codes will be transferred to cash register 150 (step 176). While not shown in the figures, one embodiment of periphery device 100 could be equipped with a "Transaction Complete" key. This key will execute steps 177-180 (FIG. 15*b*) which includes a summation routine. This routine will total the cumulative coupon savings the customer has earned: (1) on the present shopping trip, (2) in the month to date, and (3) in the year to date based on the individual card's usage. This summation data will also be stored in RAM means 23 of coupon card 1 in order that the cumulative savings may be kept up-to-date on each use of coupon card 1. The summation data will also be displayed on the periphery device 100's display screen 102 for the customer to observe and the coupon card 1 will then be ejected from periphery device 100 through insertion port 104. In an embodiment where there is no "Transaction Complete" key, periphery 100 will await the final transaction impulse recognizable from cash register 150 to determine that the transaction is finished. In the event that before pressing the "Transaction Complete" key (or before the final transaction impulse is received), an additional scan is made by the retailer's bar code scanner (interfacing with cash register 150), process steps 190-195 will be executed. If the item scanned is a paper coupon, then the subroutine seen in steps 210-225 (FIG. 15*c*) are executed. The initial step of this subroutine determines if the coupon was scanned by the scanner associated with the cash register 150 or the scanner 111 in periphery device 100. If it was the latter scanner, steps 211-217 are carried out. If it was the former scanner, steps 218-224 are carried out. Steps 211-217 determine if the coupon corresponds to a purchased item and adds the coupon to the redeemed coupon list if appropriate. If the coupon does not correspond to a purchased item, the display screens will indicate the coupon should be returned to the customer (step 213). While not shown, the routine could also indicate why the coupon is inappropriate as seen in step 183. If the coupon is a duplicate of a coupon already held in the redeemed coupon list, steps 217*a*-217*e*, which are similar to steps 162*a*-162*e*, are carried out. If the coupon was scanned by the cash register 150 scanner, a similar subroutine will be carried out in steps 218-224. However, if the coupon is for a product for which there is already a redeemable coupon, steps 220-223 will remove the coupon which originated from coupon card 1 and substitute the scanned-in paper coupon. This would be done to accommodate any paper coupons obtained in the retail store, or otherwise not scanned onto coupon card 1. When the subroutine is complete, the program will continue with step 177 (FIG. 15*b*).

The presence of periphery device 100 in the retail store will also handle transactions where no coupon card 1 is used, but where paper coupons are presented in the conventional manner. These paper coupons can also be scanned either on the bar code scanner associated with cash register 150 or on paper scanner 111 on periphery device 100. In the case of such an all-paper coupon transaction, although the coupons are not derived from coupon card 1, periphery device 100 will still validate each coupon according to its interface with the memory of the purchase data for the transaction (steps 160-164) and will instruct the cashier accordingly, speeding transaction times and favorably impacting front-end productivity. In a transaction using coupon card 1, there may be instances where a retailer employing periphery device 100 will be contractually required to redeem paper coupons through its conventional paper coupon clearinghouse. In such an instance, steps 218-224 illustrate how the periphery device 100 would process a paper coupon scanned on the scanner of cash register 150. If step 220 indicated the coupon was a duplicate of a coupon already in the redeemed coupon list, then step 221 would remove the coupon originating from coupon card 1 from the redeemed coupon list and step 222 would add the paper coupon just scanned. Alternatively, where the coupon card service provider is the clearinghouse of all coupons (i.e. originating from coupon card 1 or paper coupons presented at checkout), then it is possible that either periphery scanner 111 or the cashier scanner could be used to scan a paper coupon. In this case, step 221 would resemble step 217*d* such that the coupon originating from coupon card 1 would be accepted rather than the paper coupon. This is because paper coupons are more expensive to accept and, therefore, clear for the manufacturer. The invention, however, offers validation and recording of all coupons used in a transaction, regardless of the retail environment in which the invention is used.

Returning to step 190, if the item scanned was not a paper coupon but a product, step 191 determines if the product is an additional product (rather than a product subtraction). If the item is an additional product, step 192 duplicates the purchase data received from cash register 150 and compares it to coupon records originating from coupon card 1. If more than one of the redeemable coupons from coupon card 1 is applicable to a purchased item, step 195 executes steps 162*a*-162*e* discussed above. If not, the routine returns to step 177 and will proceed to finalize the transaction as discussed above. Alternatively, where step 191 determines that the scan was a product subtraction, step 193 determines whether or not a coupon has been applied for the removed product and if so, step 194 will reverse the transfer of the coupon to the cashier stand and the coupon will not later be recorded in coupon card 1 as being redeemed. Similarly, if the coupon previously accepted for the subtracted product was a paper coupon, the cashier will be notified by periphery 100 which paper coupon will be subtracted from the transaction and that the coupon should be returned to the customer.

Earlier in the transaction, after the redeemed coupon list has been produced (step 165), it is anticipated that there may be situations where a customer believes that he has a valid coupon for a purchased product, but this coupon has not been displayed by periphery device 100. The cashier can then press "Search" key 123 (seen in FIG. 12) activating a routine shown in steps 181-183 and step 173. By searching the manufacturer identification portion of the bar codes on the purchased products, step 181 will prepare a list of all manufacturers associated with the products purchased. In step 182, the manufacturer codes are compared to all coupons in coupon card 1 and will be used to create a list of all such coupons which are offered by these manufacturers in alphabetically descending order. Before displaying the list of searched coupons in step 173, the routine will further compare the purchase data for the purchased items to the coupons in coupon card 1 from these manufacturers in an attempt to identify why each listed coupon does not correspond to the items purchased. The routine will also place next to the coupon on display screens 102 and 109 a message 130 (as seen in FIG. 12) indicating why each coupon is not appropriate for redemption. For example in FIG. 12, the coupon highlighted is not the proper size to be considered appropriate for the product purchased.

In the situation where this search procedure does not satisfy the customer that all redeemable coupons have been identified, the cashier can execute another, more comprehensive routine represented by steps 184-188 (FIG. 15b). Steps 184-188 produce the list described above, but additionally includes all other coupons in the memory of coupon card 1. This routine is executed by the cashier pressing "All" key 125 which will induce an alphabetically descending list of the coupons. This listing of coupons will not include coupons originally found redeemable. Using the scrolling keys 120 and 121, the cashier can then review whatever coupons necessary to satisfy the customer's concerns.

If the cashier decides to redeem a technically non-redeemable coupon (after the "Search" or "All" subroutines described above, or by the "Raincheck" or "Expired" functions described below), for example, as a customer-service gesture, the cashier may redeemed the coupon by pressing the "Accept" key 126. As indicated by steps 175 and 189, "Accept" key 126 will prompt the routine to add a highlighted coupon to the list of redeemed coupons and to attach an override code to the coupon. As the cashier carries out this procedure, the addition of the new coupon to the redeemed coupon list will be seen on both the cashier's display screen 109 and the customer's display screen 102 either automatically or by the cashier pressing the "Restore" key described below. Because the override code is readable by the software of cash register 150, the override code allows cash register 150 to credit the coupon without transaction interruption (i.e. sounding the cashier to press a clear key, an override key, an enter key or any other combination thereof on the cash register) even though there is actually no proper purchase corresponding to the coupon. Additionally, as explained below, the present invention will keep track of override codes and create detailed reports indicating which the overridden coupon was and what cashier attached the override code for the retailer, and as a fraud reduction measure for the manufacturer (described in more detail below).

Another feature of periphery device 100 relates to a promotional activity carried out by many supermarkets typically called "doubling" coupons. By doubling coupons, supermarkets duplicate the value of each coupon by a factor of two and apply the entire credit to the customer's bill (tripling coupons is also carried out by some retailers). This doubling system is normally programmed into the cash register software and takes place for all coupons. However, for certain coupons, such as coupons offering discounts above a certain amount or coupons offering free items, it is not typically a supermarket's policy to offer doubling. Therefore, the periphery device 100 is provided with "Single" key 122. When the list of redeemable coupons is displayed on screen 109 and the cashier recognizes a coupon as not acceptable for doubling, the cashier may mark the coupon for non-doubling by moving the highlighting bar to the coupon and pressing "Single" key 122. As seen in flow chart step 169 (FIG. 15a), the cashier periphery 100 will rewrite the coupon to include a single marker, which will be readable by the existing software of the cash register 150, and will be immediately visible to the customer and cashier. When the redeemed coupon list is displayed as in step 166, the single-marked coupon will appear in the list with an "S" symbol 134 or other appropriate symbol as seen in FIG. 11.

The present invention also contemplates the "rainchecking" of coupons. Rainchecking a coupon occurs when an item covered by a coupon is out of stock and the coupon will expire before the store can restock the item. Rainchecking allows a customer to utilize the coupon after its expiration date. When a customer has on his coupon card a coupon for an item which is out of stock and the coupon is about to expire, the store may place a marker on the coupon indicating it has been made available for rainchecking. The present invention can raincheck coupons stored in coupon card 1 by entering into coupon card 1 a special raincheck bar code which is recognizable by periphery device 100 and will be provided to the store. For example, this rainchecking code could be provided by a bar code placed on a laminated card which would be entered into coupon card 1 through its scanner 10. The entering of the raincheck code will initiate a routine in microprocessor 25 of coupon card 1 which prepares a coupon for raincheck marking. The coupon to be rainchecked will be moved into the buffer area or "Active Coupon" area of display screen 3 by any method previously discussed. When the raincheck bar code is again scanned into coupon card 1 with the coupon still in the buffer area, the coupon will be rewritten to associate the coupon with the raincheck marker. At a later date when the customer seeks to redeem the coupon and his coupon card 1 is being read by periphery device 100, the customer may inform the cashier that he has a rainchecked coupon. When the cashier is at step 166 in the periphery device 100's programming, the cashier win press "Rainck" key 127 which will initiate steps 172-175. All coupons identified with a raincheck marker are displayed on both display screens 102 and 109 of periphery device 100 and the cashier then may use the "Accept" key 126 to redeem the appropriate rainchecked coupons. This will attach an override code to the coupon record as discussed above. As an alternative or in addition to the raincheck function, a routine could be provided which would list all expired coupons. An "Expired" key (not shown) could be provided by which the cashier would list all expired coupons and any expired coupons could be accepted as deemed appropriate by the cashier.

Whenever the cashier has displayed on the screens of periphery device 100 information other than the redeemed coupon list (e.g. by pressing "Search" key 123, "All" key 125 or "Rainck" key 127), the cashier need only press "Restore" key 124 to return the current redeemed coupon list to the display screens 102 and 109. This typically will be done when all customer inquires have been answered and the redeemed coupon list is considered complete. Another function that may be performed by periphery device 100 will be the selected removal of coupons from the list of coupons to be redeemed. There may be occasions when a customer views a certain coupon which is about to be redeemed and realizes it would be more advantageous to redeem the coupon at a later date. While not shown in FIG. 12, periphery device could have a "Remove" key. As implied by FIG. 15*a*, after selecting a coupon with the highlight bar in step 166, selecting the "Remove" key would place a marker in the coupon record as indicated in step 171. After which, any listing of redeemed coupons will not include the coupon so marked.

When the redeemed coupon list is complete, the cashier presses "List/Send" key 108 a second time which will prompt microprocessor 113 to transfer the coupon data to cash register 150 where the value of the coupons will be credited against the customer's purchases. It will be understood that as this transaction is carried out, the bar code scanner at the cashier stand has been completely bypassed with respect to coupons originating from coupon card 1. The periphery device 100 also transmits to coupon card 1's RAM means 23 data indicating which coupons were redeemed, which removes from RAM means 23 the bar codes corresponding to the redeemed coupons. After these functions are carried out, periphery device 100 will release coupon card 1 from insertion port 104 and the customer may remove his coupon card. Prior coupon redemption methods require all functions to be carried out with each coupon. Prior methods first had to manually scan the individual paper coupon. If the coupon was not accepted by the cash register, the customer and cashier would be required to inspect the paper coupon and the shopper's receipt of purchased goods in an attempt to discover the reason for rejection. Any attempts to "single" or "raincheck" a coupon or override a coupon rejection required a special set of actions by the cashier. These steps could possibly have to be repeated for any number of coupons the shopper was attempting to redeem, causing delay for the other shoppers and embarrassment for the coupon redeeming shopper. The method of the present invention significantly increases the speed and efficiency of the redemption process as compared with the prior art. The present invention carries out the validation and other special functions for all coupons prior to the coupon data being transmitted to cash register 150. This comprehensive method of handling coupon redemptions and coupon-related processes will save shoppers and store cashiers significant amounts of time as compared to the coupon processing by coupon redemption methods of the prior art. By increasing the transactional speed of the coupon redeeming procedure, the present invention greatly increases the front-end productivity of a retail store. Existing cashiers will be able to checkout a higher volume of customers without personnel performing other necessary tasks in the store being forced to man additional cash registers.

While customer display screen 102 has been discussed as displaying prompting messages and redeemed coupon lists, it could also function as an advertising media in an alternate embodiment. When a coupon card 1 is not inserted into periphery device 100, periphery device 100 could be used to display digital video images advertising different products. This could be accomplished by equipping periphery device 100 with the necessary Video RAM needed to run such digital video.

As suggested in FIG. 1, a third element of the present invention is a server computer or server 200. Server 200 will be connected to periphery device 100 through communications port 110. In the embodiment shown, communications port 110 is a conventional local area network (LAN) connection. It is envisioned that server 200 will typically be located in the same store as the periphery devices 100 and will sort information from all periphery devices 100 in that store. One function of server 200 will be to collect from all periphery devices 100 the data related to the volume of coupons redeemed by the periphery device 100. This redeemed coupon data will be used, in part, to create coupon redemption reports for the retail outlet in which server 200 is stationed. The retailer redemption report will be stored to a separate directory to which the retailer will have access. However, server 200 will have strict software security protocols to insure the retailer has access only to his directory and cannot access or alter any redemption-related data. Server 200 will have a self-executing program that will automatically generate the reports at a given time period, typically on a daily basis in the evening when sales activity has declined. The reports may include information such as total coupon redemptions that day, total redemption sums per manufacturer, total redemption sums per cash register and/or cashier, and detailed information on overrides and misredemptions. Because a large percentage of coupon fraud occurs through inappropriate acceptance of coupons, the report information regarding overrides and misredemptions is an important factor in attempting to limit fraudulent redemptions. By providing the retail store with exact data on when and on what cash register inappropriate coupons were redeemed, the store management can determine whether a cashier is properly accepting a limited number of inappropriate coupons as a customer service gesture or whether a cashier is frequently using the override process for possibly fraudulent purposes. Additional reports could provide the store with detailed information on analysis of misredemption increases or decreases as compared to prior week(s), or an analysis of coupon traffic by shift.

The directory of server 200 to which the retailer has access also provides a method for the retailer to enter the information relevant to each store which is part of the system. For example, the retailer will be able to enter information such as cashier names, cashier identifying numbers and the register at which a cashier works in order for the redemption reports to identify overridden coupons with a particular cashier. Additionally, the retailer-accessed directory will allow a retailer to place in periphery device 100 necessary coupon data (e.g. bar codes and redemption requirement data) for coupons which that particular store or chain is offering. A retailer may also enter into the retailer-accessed directory information that will allow that retailer to accept the coupons of a competing retailer or retail chain. As an alternative to loading these retailer coupons on server 200 or retrieving redemption requirement data from periphery device 100 by way of server 200, periphery devices 100 could be employed which have the capability to accept coupon data directly from a "floppy" disk or other portable data storage means. When coupons are directly loaded onto periphery device 100, periphery device will be able to distribute coupons directly to coupon card 1. Thus periphery device 100 could act as one form of a coupon "dispenser", which will be discussed in more detail below.

A second function of server 200 will be to communicate redeemed coupon data to a clearinghouse 300. Clearinghouse 300 will have high-capacity computer system such as a main frame or an IBM large system having a high capacity database which also has the ability to back up and archive to tape drives. The system will also have a multichannel CPU and a multi-line front end processor. At a regular time interval, typically daily, server 200 will store the redeemed coupon data for the past day in a file which can be accessed through a modem by remote clearinghouse 300. Because of the large amounts of data transmitted, it will be preferable to upload a store's redemption data for the day into a directory as a single compressed file and transmit the file using high speed modems (28,800 bps or higher).

The information compiled by clearinghouse 300 from the many local servers 200 will be used to generate at least two types of reports. The first type of report will be a compilation for an entire chain of stores (such as a supermarket chain) of the total amount of redemptions for the chain and the amount of redemptions for each store in the chain. This allows the store chain to determine what amounts the manufacturers of the couponed products owe to the store chain for that period and how these proceeds should be distributed among the various outlets. The second type of report will be a compilation of what redemption amounts a manufacturer owes each supermarket chain, thereby allowing the manufacturer to reimburse the store chain. Because redeemed coupon data is transmitted by modem to clearinghouse 300, information concerning amounts owed by manufacturers to retailers may be distributed to the parties with a minimum of delay and allow prompt repayment by the manufacturers. This is of great importance to retailers since discounts given by a retailer to redeem a manufacturer's coupons are in effect an extension of credit to the manufacturer. In the case where the coupon card service provider charges the customer a transactional fee for using coupon card 1, the retailer would normally collect the fees and would then be the entity to have temporary use of these funds. An additional advantage derived from the compiling of redemption data is the ability to generate very specific redemption rate statistics. Not only may the statistics be generated on a national basis, but may be also be broken down into regional, state, county, city or zip code based statistics.

Another function of clearinghouse 300 will be to maintain a database of redemption requirement data for all coupons offered and all coupons to be offered by manufacturers and retailers. This information will be obtained from manufacturers and retailers when they register with the provider of the coupon card services. Clearinghouse 300 will periodically transmit redemption requirement data for future coupons to periphery devices 100 through local servers 200. From periphery device 100, the updated redemption requirement data can be entered into coupon card 1 of customers even before the paper coupons are published. Thus when the paper coupons are published and the bar codes appearing thereon are scanned into coupon card 1, the redemption requirement data will appear on the display screen 3 of coupon card 1 and the customer will be allowed to manipulate the coupon record as described above.

While a preferred embodiment of the present invention describes periphery device 100 being used in conjunction with a local server 200, the scope of the present invention is intended to cover an electronic coupon system wherein periphery device communicates directly with a remote clearinghouse 300. While less efficient, this could be accomplished by providing each periphery device 100 with a modem or similar means for transferring data to and receiving data from a clearinghouse 300. A still further alternative would be to have no direct communication from a remote clearinghouse 300, but rather obtain coupon data on disks or other storage means and load the data directly into the periphery devices 100.

One advantage of the present invention originates from the invention's ability to identify individual users of the coupon card with the purchases they make. Because periphery device 100 identifies the coupon card 1 being inserted with the person to whom the coupon card 1 is registered and because all items entered into cash register 150 will be read by periphery device 100, data indicating the purchases made by each individual using coupon card 1 may be sent to and collected by clearinghouse 300. The compilation of the names of consumers and what they buy into a comprehensive database will allow detailed consumer micromarketing data (CMD) to be organized and distributed to manufacturers and retailers across the geographical area covered by the coupon redemption system. Because coupon records contain markers indicating the distribution channel of the coupons (e.g. free standing inserts, dispensers, pager systems, telephone interfacing, the Internet, or series or value increasing coupons—all discussed below), superlative CMD can be provided indicating exactly what methods of distribution are most effective with what products and with which consumers. This CMD could be used to target specific consumers for specific products those consumers may have a tendency to purchase. For example, this data could supply manufacturers with information on the identity of their customers using the manufacturers' products so that manufacturers could take further marketing steps to insure these customers' continued loyalty. Alternatively, a manufacturer could receive information on which consumers are buying a competitor's products so that a manufacturer could attempt to induce those consumers to switch to his product. The CMD could also identify what consumers are sensitive to particular types of promotions. For example, a manufacturer of a new product promoted as being environmentally safe could secure a list of individuals who typically buy environmentally safe products. Because of the speed and accuracy with which CMD may be compiled, it can help manufacturers determine how a particular promotion is being received by the public and allow the manufacturer to respond appropriately (e.g. by value increases discussed below). It will be understood that CMD could be organized in practically an infinite number of ways to produce customized reports which would help manufacturers and retailers target specific customers for advertising campaigns and promotions.

Another advantage of central clearinghouse 300 interacting with periphery device 100, and of the coupon card service provider's ability to ascertain the identity of the coupon card owner, will be in the establishment of an instant rebate system. Presently manufacturers typically provide rebates by including a written rebate offer with the product purchase and requiring the customer to fill out the information requested by the rebate offer and return the rebate information to the manufacturer. Because of the effort and time involved, customers generally do not take advantage of rebate offers resulting in a "redemption" rate even lower than that associated with coupons. However, clearinghouse 300 could provide to server 200 and subsequently to periphery device 100 yet another database which would contain a compilation of all rebates offered by manufacturers participating in the instant rebate system. This information would periodically be transmitted to and stored in local servers 200, and therefore, would be accessible by the periphery devices 100. After the purchase data is read by periphery device 100 for comparison to the coupon data, a separate routine will compare the purchases made to the rebate information stored in local server 200. The total value of rebates for which the customer qualifies is then displayed on screen 102 of periphery device 100 and the customer is prompted with a message asking if he would like the amount of the rebates instantly applied against his shopping bill. The customer may respond by pressing the "Yes" key 132 or "No" key 133 seen on periphery device 100 as seen in FIG. 11. A record of the rebates accepted will be stored in server 200 and later transmitted to clearinghouse 300. Server 200 will provide the store with a report on the total rebate sums owed to it by the manufacturers and clearinghouse 300 will provide the manufacturers with reports on the amounts owed to the store chains. Clearinghouse 300 will also provide manufacturers with reports based on the CMD compiled from the rebates.

Another advantage of the electronic coupon redemption system described above will be the ability to alter the value of a coupon after it has been scanned into coupon card 1. There are various marketing reasons manufacturers may wish to alter the value of a coupon that has already been published. For example, if a coupon for a new product has been published but consumer response has been less than expected, the manufacturer may desire to raise the value of the coupon to stimulate sales. Presently, manufacturers publish coupons and may have to wait months for statistics illustrating how successful the coupon was in stimulating sales. If the manufacture then wishes to provide new coupons with higher discounts for the product, the manufacturer must go through the entire publishing process a second time.

Figure 16:
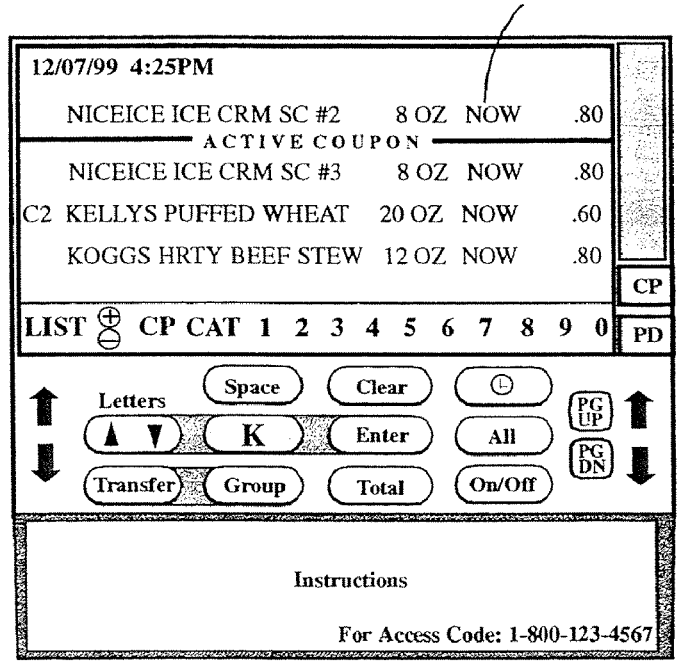
FIG. 16 is a illustration of how the coupon card alerts the user that coupons have increased in value.

The present invention provides a novel solution to this present disadvantage by allowing a coupon already scanned into coupon card 1 to change in value. Since a manufacturer participating in the system will receive prompt information on consumer reaction to a coupon through the redemption reports issued by clearinghouse 300, the manufacturer can rapidly respond to redemption rates and market feedback and "reuse" the coupon by increasing its value nationally, regionally, or in a more specific locale. If the manufacturer wishes to increase the coupon's value, clearinghouse 300 will, on instructions from the manufacturer, create a new bar code and new redemption requirement data showing an increased value for the coupon's redemption. This new bar code and redemption requirement data is then transmitted to periphery devices 100 by server 200 along with other redemption requirement data for future coupons. When a coupon card is placed in periphery device 100, the original bar code of the coupon which is to be increased in value will be located and the new bar code along with the new redemption requirement data will replace the previous bar code and redemption requirement data. To make the coupon card user aware of the increase in the value of the coupon, the coupon record will contain a marker which will display the coupon on display screen 3 of coupon card 1 during the next start-up (after turning coupon card 1 on) with an appropriate message advising the user of the coupons increase in value. An example of such a message could be the "NOW" message 131 preceding the new value of the coupon as seen in FIG. 16. Of course, in the event the manufacture chooses to decrease the value of the initial coupon, the same method could be applied. This method allows a manufacturer to continually restimulate the coupon card user to buy the product covered by the coupon each time the manufacture raises the coupon's value. Alternatively, a value increase in a coupon could be based on the length of time a coupon has remained in coupon card 1 without being used. If the coupon card user does not redeem the coupon within a certain time period, the value could be increased to give him added incentive to use the coupon.

Figure 17:
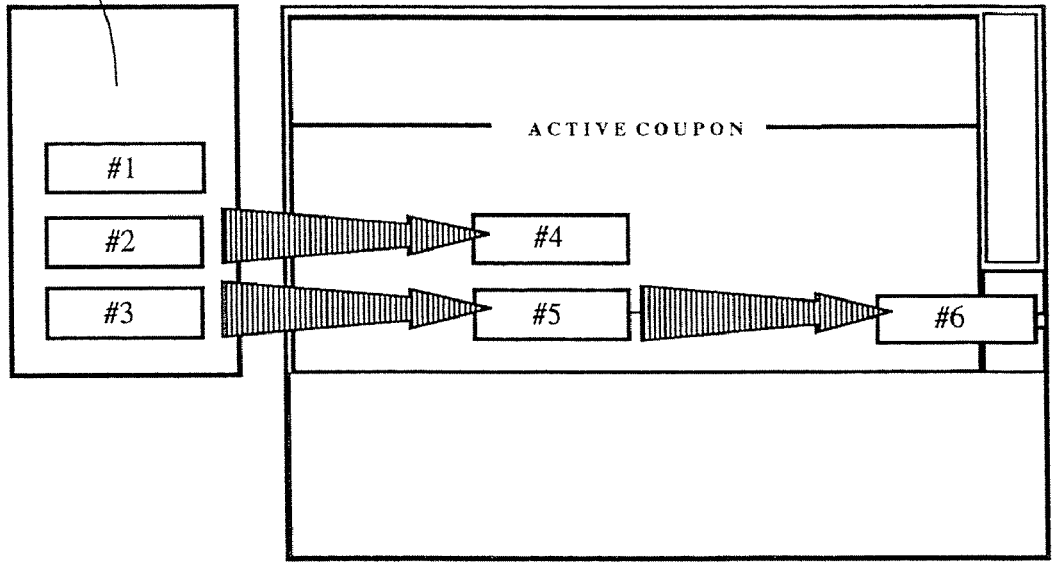
FIG. 17 is graphical representation of how the concept of series coupons will be carried out.

A similar advantage can be realized with the present invention through altering the value of existing coupons in order to create "series coupons". Series coupons will comprise a set of at least two coupons where the later coupons will increase in value as the earlier coupons are redeemed in a given sequence. FIG. 17 represents graphically how the present invention will carry out the series coupon system. The paper publication of the coupons will typically contain a series of multiple (three in the present example) coupons each having a separate bar code as illustrated by box 135. These coupons will be scanned into a coupon card 1 in the manner described above. When the coupon card user inserts coupon card 1 into periphery device 100 to redeem coupon #1 and all coupon records are transferred to periphery device 100, periphery device 100 will recognize coupon #1 is one of a series of coupons. Periphery device 100 then reads the other coupon records received from coupon card 1 to determine if coupons #2 and #3 have been previously redeemed (i.e. out of sequence). If coupons #2 and #3 have not been redeemed, then the coupon records for these coupons will be replaced with the coupon records of coupons #4 and #5, where coupons #4 and #5 represent a predetermined increase in value relative to coupons #2 and #3 (e.g. doubling the value) for the same product(s). The records representing the new coupons will then be transferred back to coupon card 1 and coupons #4 and #5 may be redeemed at the coupon card user's next shopping trip. The same procedure will take place when coupon #4 is redeemed and periphery device 100 reads for coupon #5 to determine if it has been redeemed. If not, then coupon #5 is replaced with a record corresponding with coupon #6. Alternatively, if coupons #2 or #3 have been redeemed out of sequence, then an increased value coupon would not replace the coupon redeemed out of sequence. Manufacturers may use series coupons to encourage consumers to buy one product as a way to increase discounts on another product. For example, if the manufacturer has a new product and wishes to encourage consumers to try it, the manufacturer may make the new product the first coupon in the series with the second and third coupons being for products of proven popularity. It will be understood that this method in effect turns a "static" coupon into a "dynamic" coupon of selectively varying values.

Figure 18A:
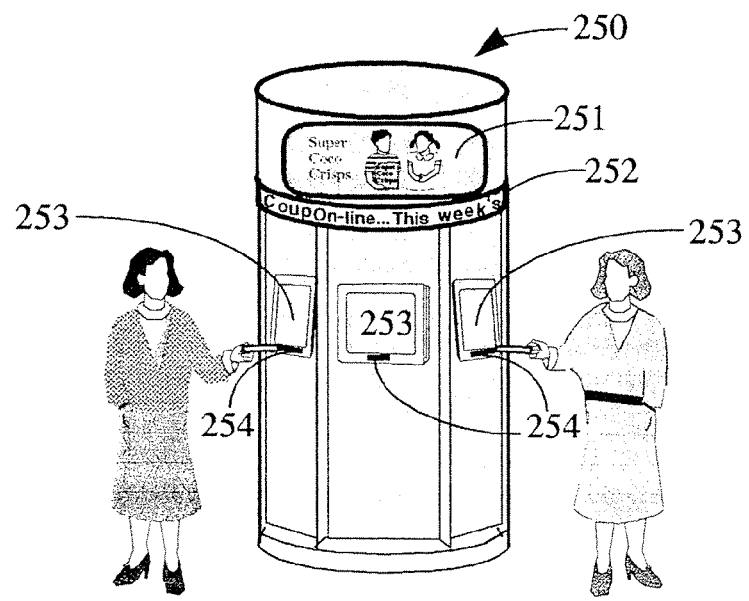
FIG. 18a is a front view of a coupon dispenser contemplated by the present invention

An additional embodiment of the present invention will comprise a method and apparatus to disseminate coupon data and advertise the products associated with the coupons. The apparatus employed will include a dispenser, which in the present embodiment is in the form of a kiosk or other stand such as seen in FIG. 18a. Dispenser 250 will be placed in stores in an area readily accessible to customers, such as at the end of an aisle in a supermarket. Dispenser 250 may include a video monitor 251 prominently positioned where it will easily be viewed by all passing shoppers. A preferred embodiment of dispenser 250 will also have a continuously scrolling message display 252 which may be similar to the SILENT RADIO® display manufactured by Cybernetic Services, Inc. of Chatsworth, Calif. The video monitor 251 and scrolling message display 252 provide advertising for coupon related products to all passing shoppers as opposed to just shoppers who read free standing inserts in which paper coupons appear. To interface with shoppers, dispenser 250 will comprise multiple stations each having a touch screen monitor 253 and coupon card insertion port 254.

Figure 18B:
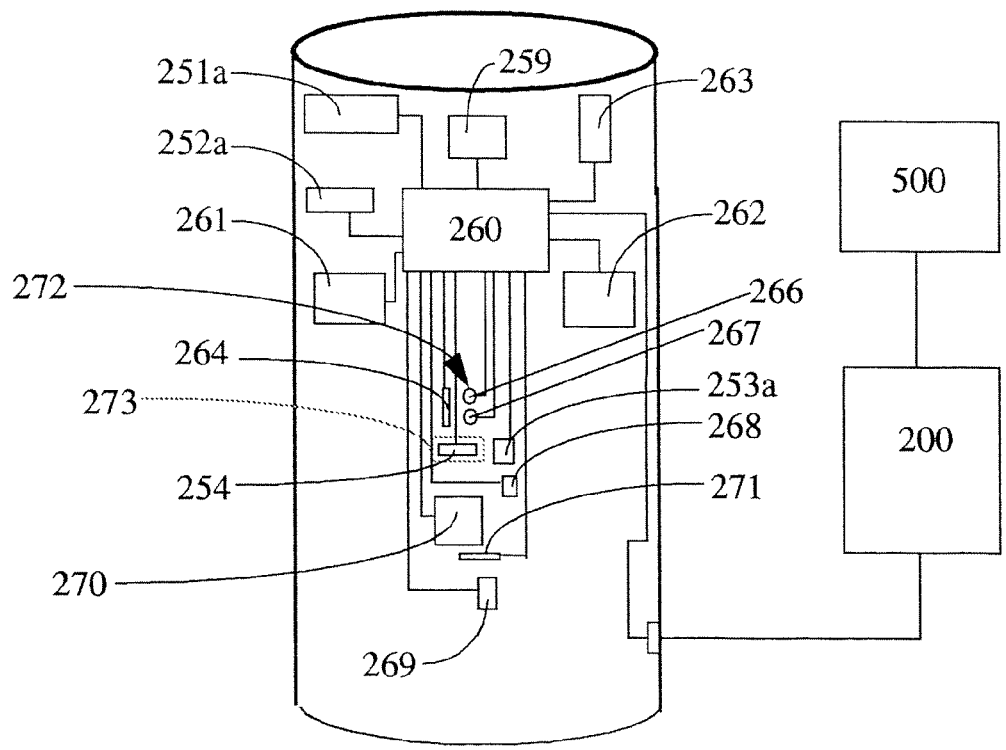
FIG. 18b is a schematic view of a coupon dispenser contemplated by the present invention.

FIG. 18b illustrates schematically the principle components of dispenser 250. The operation of dispenser 250 will be controlled by microprocessor 260. The operation of video display monitor 251 is carried out by the connection of monitor feed 251a, sound output 263 (such as a conventional speaker), and Video RAM (VRAM) 259 to microprocessor 260. Similarly, scrolling message display 252 will also have a feed 252a connected to microprocessor 260 and receive the advertising data to be displayed from RAM means 261. Microprocessor 260 will read the routines needed to operate video display monitor 251 and scrolling message display 252 from ROM means 262. In operation, dispenser 250 will continuously display the video and scrolling message advertising information in order to advise shoppers of the products for which the coupons may be obtained. When a shopper inserts his or her coupon card 1 into coupon card insertion port 254, seating device 273 (indicated by dashed lines) will position coupon card 1 such that its light emitting diode 20 and its light responsive transistor 21 are respectively aligned with a light responsive transistor 267 and light emitting diode 266 of communications port 272. On insertion of coupon card 1, bar code reader 264 reads the coupon card identifier bar code 12 and insures coupon card 1 has not been reported to the coupon card service provider as lost, stolen or delinquent. Microprocessor 260 will then transmit to touch screen 253 through feed 253a a prompt which states the different groups of coupons the shopper may obtain and the price for each group. For example, a preferred embodiment will provide a group consisting of coupons from national manufacturers and the store chain in which the dispenser 250 is located. An alternate group would consist of coupons from national manufacturers and all store chains in the shoppers region. When the shopper selects a group of coupons, the coupon data for those coupons is loaded onto the shopper's coupon card 1. Along with the coupon data, a charge code reflecting the price of the coupon group is also loaded onto the coupon card 1. After the coupon data is transmitted to coupon card 1, another routine will display on touch screen 253 a "YES/NO" prompt inquiring whether the shopper desires to edit the "shopping list" of coupons that may be stored in coupon card 1. If the shopper presses the "Yes" portion of touch screen 253, two scrollable lists will appear. One contains the coupons in coupon card 1's shopping list while the second contains all of the coupons just transmitted to coupon card 1. By use of touch screen scrolling keys which will appear next to each list, the shopper may move a highlight bar to a coupon on the new coupon list and add the coupon to the shopping list by pressing "+" or other appropriate symbol on touch screen 253 when a coupon in the shopping list is highlighted. Coupons can be removed from the shopping list display by pressing a "−" or other appropriate symbol on touch screen 253. When the shopper presses a symbol on touch screen 253 indicating he wishes to make no more changes to the shopping list, another "YES/NO" touch screen prompt will inquire as to whether the shopper wishes to print the edited shopping list, which will contain redemption requirement data reflecting desired products for which the consumer has a coupon discount in coupon card 1. If the shopper presses the "Yes" symbol on touch screen 253, the list will be transmitted to printer 270 and printed out in hard copy form. Microprocessor 260 will also transmit the new shopping list to coupon card 1 for storage in its RAM means 23. When the shopper presses a symbol indicating the end of the transaction, seating device 273 will return the coupon card 1 to the customer.

Prior to ending the transaction, a preferred embodiment of dispenser 250 could also provide the shopper with the ability to store debit or credit card information on coupon card 1 which would allow the shopper to use coupon card 1 in place of a debit or credit card when he "checks out". This will enable the consumer to not have to use multiple cards during a transaction and will insure that when a customer has coupons to redeem, he will also have a means of payment. Dispenser 250 will include a magnetic stripe card seating device 273 and a magnetic stripe reader 271 capable of receiving and reading a conventional magnetic striped card. Microprocessor 260 will read the access information on the magnetic stripe of the debit or credit card and transfer this to RAM means 23 of coupon card 1. Microprocessor 260 will then establish a "link" between the debit or credit card by interfacing with the debit or credit card network. Typically this interface will be through a dial-up connection or through a leased line. After the shopper has finished redeeming coupons through periphery device 100 during the check-out process, periphery device 100 will prompt the shopper as to whether he wishes to pay with the debit or credit card previously read into coupon card 1. If so, periphery device 100 will recognize there is card access information stored in coupon card 1 and will use the access information obtained from the card to again interface with the correct debit or credit card network. Periphery device 100 will also interface with the debit or credit card network through a dial-up connection or through a leased line. In this embodiment of periphery device 100, a "ten-key" pad will be attached to slot 142 on periphery device 100 as discussed above. The necessary personal identification numbers (PIN) required by the debit or credit card issuer may be entered on the "ten-key" pad. As an extra security measure, the coupon card system could require that the credit card "link" be performed using the credit card PIN similar to when obtaining cash advances with a credit card.

When the shopper redeems coupons by inserting coupon card 1 into periphery device 100, a routine executed by periphery device 100 will upload the charge code placed on the coupon card 1 by coupon dispenser 250 to cash register 150. The amount of the charge will then be credited to the company providing the coupon card services of the present invention. However, this charge may be collected and kept by the retailer, in effect, allowing the retailer another form of instantaneous coupon redemption payback. Once the charge has been added to the customer's bill, the routine will remove the charge code from coupon card 1 and send a record of the charge collection to server 200 for eventual transmission to clearinghouse 300.

In a preferred embodiment, dispenser 250 will be integrated in the LAN of the store by being connected to server 200 described above. Dispenser 250 will then be capable of receiving coupon data and advertising information from a remote database 500. Remote database 500 will supply dispenser 250 with both advertising information to display on the video monitor 251 and scrolling message display 252 and the electronic coupon data which the customers will receive. It is envisioned that manufacturers and retail chains will directly transmit their coupon data (bar codes, redemption requirement data and other information) to the remote database 500 where the data will be segregated into separate sub-databases. For example, coupon data from regional supermarket chains would be placed in a regional database and coupon data from national manufacturers would comprise a national database. Further databases may be defined by combining regional and national databases for any given region. This last database will supply the regional retail outlets with both national coupon data and the correct regional coupon data for the outlets in the respective regions.

Advertising information may also be compiled in a similar manner. Manufacturers and regional retailers may transmit to the remote database various video programs advertising their products. This advertising data can then be broken down into national and regional sub-databases just as the coupon data described above. Scrolling message display advertising data will be provided to include the brand names of all products for which coupon data is collected. Thus insuring every product having a coupon in the database 500 will be advertised regardless of whether or not there is associated video advertising data. Scrolling message display advertising data will also be segregated into national and regional sub-databases.

The illustrated coupon dispenser 250 provides numerous advantages to manufacturers attempting to attract shoppers' interest. The video and scrolling message displays are cheaper and may be more quickly published than hard copy advertising in FSIs. As opposed to a coupon being viewed only once if the shopper reads the FSIs, the video and scrolling message displays are continuously run and may be viewed each time the shopper passes dispenser 250. Additionally, the advertisements in FSIs are only seen by the comparatively small number of shoppers who are in the habit of reading FSIs. On the other hand, the video and scrolling message displays will potentially be seen by every shopper entering the store. Further, dispensers 250 positioned in retail stores have the advantage of advertising products which are only a few steps away. FSIs generally reach shoppers in their homes and require them to remember to purchase the product at some future date. As a marketing tool, retailers and manufacturers could display next to their products a message indicating coupons for the product can be obtained at the nearest dispenser 250. Thus the decision to purchase products can be favorably influenced by the immediate access to a coupon. Since coupons from a dispenser 250 can easily be combined with a marker indicating the origin of the coupon, the coupons are readily usable for the gathering of CMD. Finally, a system dispensing coupons from a coupon dispenser 250 is totally paperless and may accommodate regional and store specific coupons.

Figure 19A:
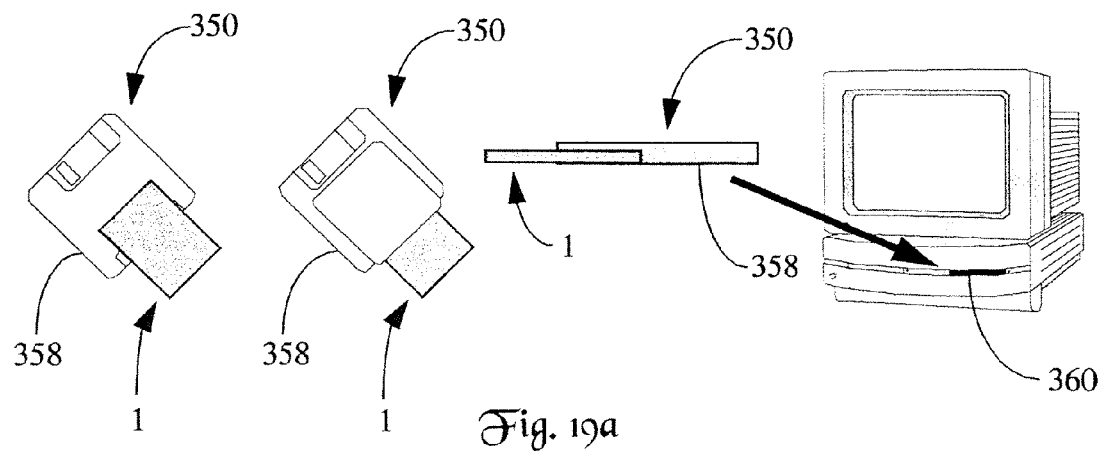
FIG. 19a is an illustration of how an adapter for a coupon card will form the interface between a computer disk drive and the coupon card to allow coupons to be retrieved from sources interfacing with the computer, such as the Internet.
Figure 19B:
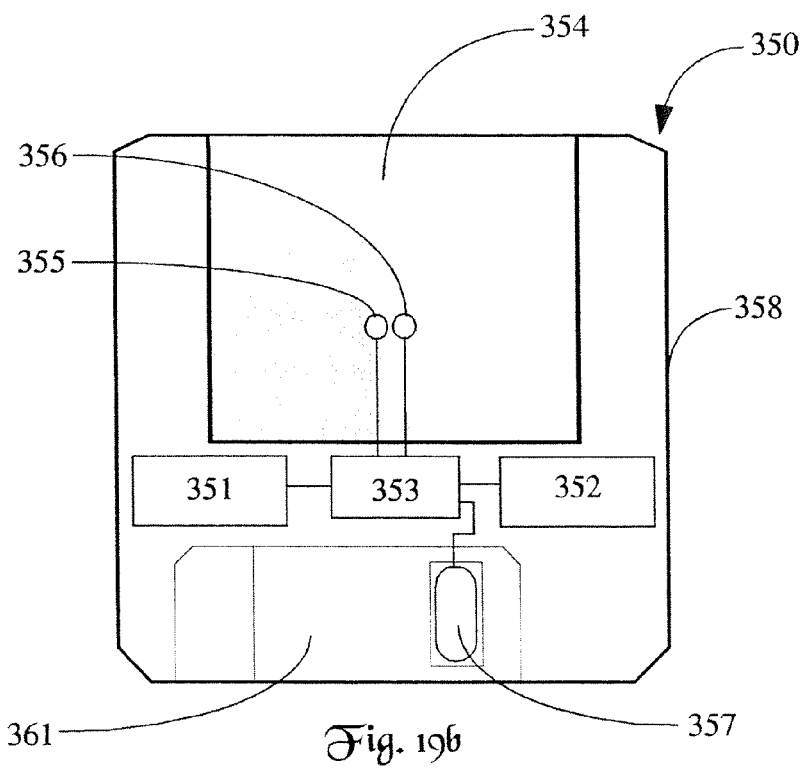

Another method of electronically transmitting coupons is through an Internet coupon card service by means of the adapter illustrated in FIGS. 19a and 19b. The adapter will be capable of being inserted into a conventional 3.5" floppy disk drive and transferring information stored on the adapter to coupon card 1. While the embodiment illustrated is an adapter compatible with a 3.5" floppy disk drive, the adapter could be formed to fit any conventional disk drive. Software may also be readily adapted to render receiving coupons over the Internet more user friendly by allowing the coupon card owner to navigate the coupon card Internet service. The software will provide the means for recording coupon card 1's identifying card number and verifying the person receiving coupons is registered with the provider of the coupon card services. The software will also allow users to browse the coupons available on the Internet site and categorize and store the coupons retrieved from the Internet in coupon card 1 in the same categories as exist on coupon card 1. Alternatively, the coupons may be downloaded to the hard drive of the Internet accessing terminal or other memory storage space (regardless of whether the terminal is a computer, cable box or other terminal) and be transferred at a later date to coupon card 1.

A preferred embodiment of adapter device 350 is seen in FIG. 19a and will have an adapter body 358 which is approximately the size of a conventional 3.5" "floppy" disk and may be inserted in conventional disk drive 360. It will be understood that disk drive 360 of the Internet accessing terminal has a magnetic head for reading from and writing to conventional "floppy" disks. As seen in FIG. 19b, the adapter body will have a insertion port 354 which is sized to receive an electronic data storage device such as coupon card 1. Adapter body 358 will also include a magnetic head 357 which will be positioned on adapter body 358 such that when the adapter body 358 is inserted into disk drive 360, magnetic head 357 will be able to communicate with the magnetic head existing in the disk drive 360. While the embodiment illustrated describes interfacing with disk drive 360 having a magnetic head, it is envisioned that a writable CD disk drive may be encountered in the future. To be compatible, it is only necessary that an alternate head 357 be used which would be capable of interpreting laser impulses to convert those impulses to electrical impulses for storage on coupon card 1.

A slidable cover 361 such as found on conventional floppy disks will cover magnetic head 357 until adapter 350 is inserted into disk drive 360. Magnetic head 357 will receive magnetic data from disk drive 360 and convert this magnetic data into electrical data which may be transferred to a processing means such as microprocessor 353. Microprocessor 353 may store the contents of the electrical data in RAM means 352 until such time as it is ready to effect the further transmission of the data to coupon card 1. Adapter body 358 will also include a ROM means 351 which will provide microprocessor 353 with the necessary routines to carry out the transmission of the data received from magnetic head 357. RAM means 352 and ROM means 351 collectively form the memory means of adapter 350. Operatively connected to microprocessor 353 and positioned in insertion port 354 will be a wireless transmitting means such as light emitting diode 355 and light responsive transistor 356 for interface with coupon card 1.

Coupon card 1 is first positioned in communications port 354 with light emitting diode 355 and light responsive transistor 356 respectively aligned with light responsive transistor 21 and light emitting diode 20 of coupon card 1. Adapter 350 is then inserted into disk drive 360 and is ready to receive coupon data from the Internet and transfer them to coupon card 1. When the coupon data has been downloaded from the Internet and transmitted to disk drive 360, the magnetic head of disk drive 360 will transfer the magnetic data to magnetic head 357. Magnetic head 357 will convert the magnetic data into electrical data which microprocessor 353 may initially store in RAM means 352. Microprocessor 353 will then convert the data stored in RAM means 352 into electrical impulses that are transmitted to light emitting diode 355. Light responsive transistor 21 of coupon card 1 will receive the light signals from light emitting diode 355 and these signals will be converted back from light impulses to electrical impulses to be read and converted into electrical coupon data by microprocessor 25 of coupon card 1. Any necessary signals from microprocessor 25 to microprocessor 353 will be transmitted to light responsive transistor 356 by light emitting diode 20 of coupon card 1. When the transfer of coupon data from adapter 350 to coupon card 1 is complete, adapter 350 may be removed from disk drive 360 and coupon card 1 removed from insertion port 354.

Figure 20A:
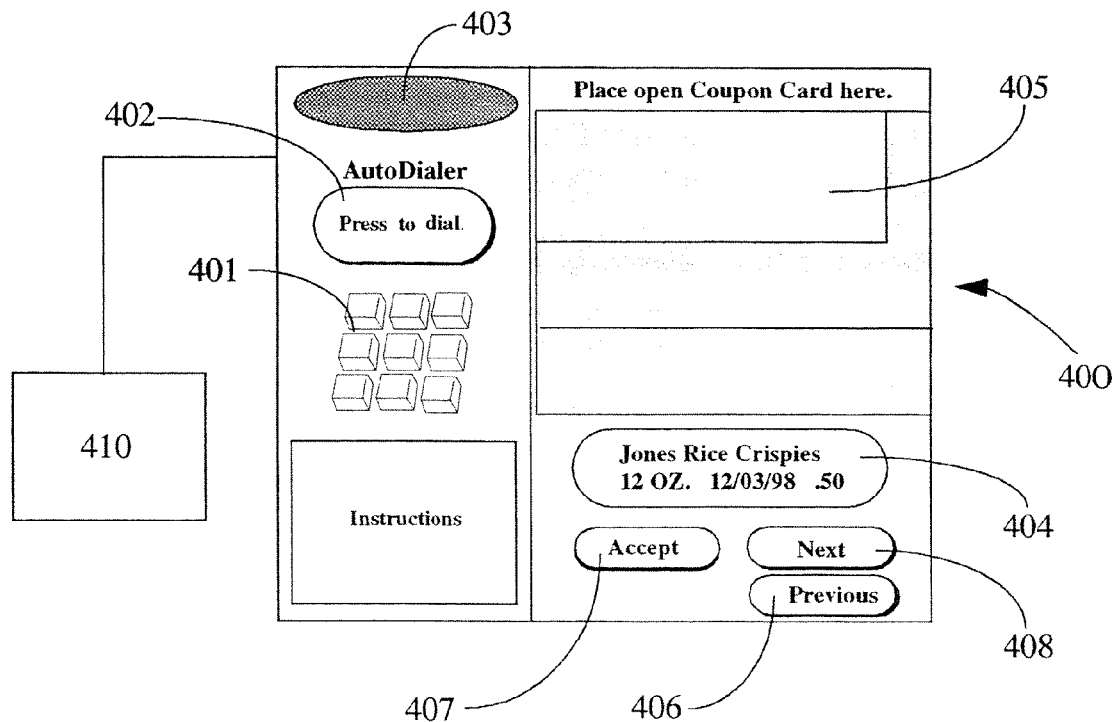
FIG. 20a is an illustration of a telephone interface allowing transfer of coupons from a remote database to the coupon card by way a telephone connection.
Figure 20B:
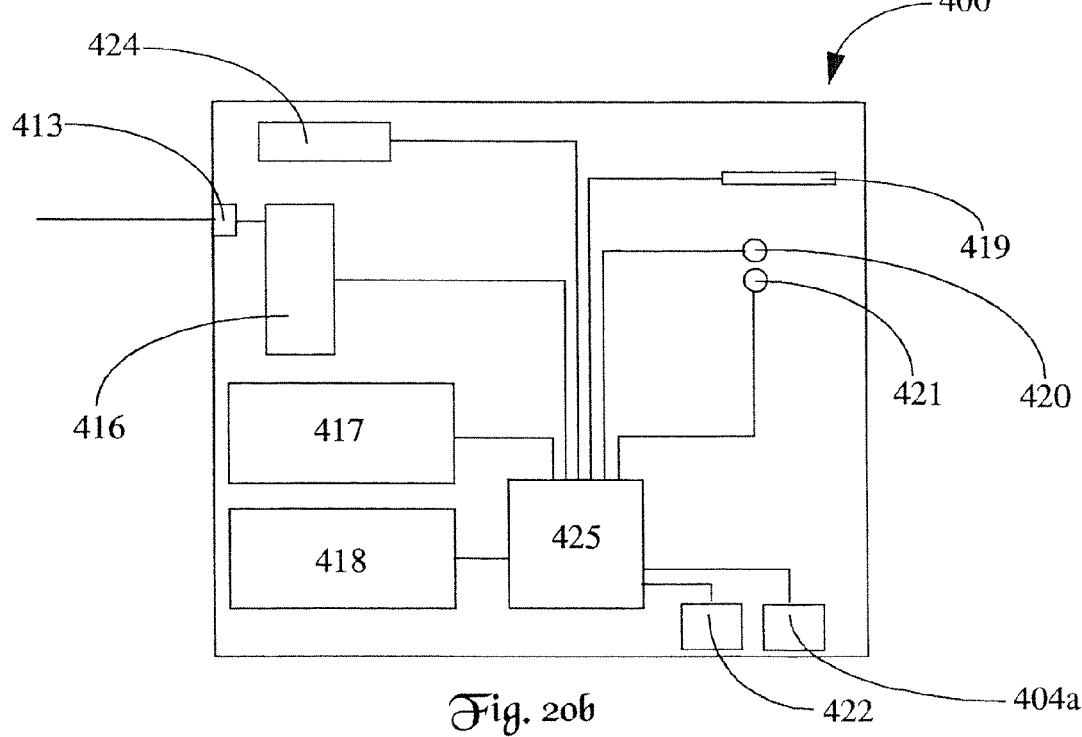

Still another device for electronically transmitting coupons from a remote database to individual customers is seen in FIGS. 20a and 20b FIG. 20a illustrates the configuration of telephone interface 400. When using telephone interface 400, the user will be dialing to a remote database 410 similar to that described above for the coupon dispenser 250. Telephone interface 400 will have a conventional telephone subcomponent that will include autodialer 402, telephone keypad 401, and speaker 403. Autodialer 402 will dial the telephone number of the remote database 410 and a speaker 403 will allow the user to listen to instructions and information provided by an automated telephone system located at the remote database 410. Telephone keypad 401 will allow the user to select various options in response to instructions from the remote database 410's automated telephone system. In addition to the telephone subcomponent, an insertion port 405 will be positioned to the side of keypad 401 and be sized to receive a coupon card 1 when it is in the open position (i.e. cover 8 being unfolded downward). Adjacent to insertion port 405 there will appear an LCD display screen 404 for relaying coupon information to the user. An alternate embodiment could have a display screen larger than that shown in FIG. 20a or could be equipped with sufficient RAM or Video RAM in order to display graphics images of coupons. There will also be an "Accept" key 406 for accepting coupons displayed on screen 404 and a "Next" key 408 and "Previous" key 407 allowing the user to scroll through the coupons displayed on screen 404.

The components of telephone interface 400 (not including the telephone subcomponent) which receive coupon data from a remote database 410, manipulate the data and then transfer it to coupon card 1 are illustrated in FIG. 20b. A female telephone jack 413 connects to a conventional phone line such that the telephone signal may be received by modem 416. The data received by modem 416 may then be directed to microprocessor 425. Microprocessor 425 will store the data in RAM means 417 and read from ROM means 418 the routines needed to carry out the functions of telephone interface 400. A display screen feed 404a will carry signals from microprocessor 425 to display screen 404. Bar code reader 419, light emitting diode 420, and light responsive transistor 421 will be position such that they may interact with coupon card 1 when it is placed in communications port 405. Bar code reader 419 will read the identifier bar code 12 on coupon card 1 to insure it has not been reported lost stolen or delinquent. Light emitting diode 420 and light responsive transistor 421 will provide the means for transferring coupon data to coupon card 1 through its light emitting diode 20, and light responsive transistor 21. To aid the visually impaired, telephone interface 400 could also include a voice chip 422 connected to microprocessor 425. Voice chip 422 would allow telephone interface 400 to communicate in verbal form through audio emitter 424 the information appearing in display screen 404. Audio emitter 424 could also serve to give audio error messages when the user is imputing unacceptable commands (such as attempting to accept a coupon he has previously entered into his coupon card 1 or pressing "Previous" key 407 too many times).

In operation, the user will place his coupon card 1 in communications port 405 and press the autodial 402 to initiate the connection with the remote database 410. The automated answering system at the remote database 410 will inform the user the type of coupons he may receive. Through use of the telephone keypad 401 in response to prompts from the automated answering system, the user will narrow the category of coupons he wishes to review. When the user has selected a category of coupons with telephone keypad 401, these coupons will be displayed individually on display screen 404. The user may scroll up or down the list of coupons by pressing the "Previous" key 407 or the "Next" key 408. When a coupon the user wishes to obtain appears on screen 404, the coupon may be transferred to the coupon card 1 by pressing the "Accept" key 406. Microprocessor 425 then transmits the coupon data through appropriate signals to light emitting diode 420. These signals are received by light responsive transistor 21 and the coupon data is stored in RAM means 23 of coupon card 1.

Another method contemplated by the present invention of electronically transmitting coupon data uses conventional digital pager technology. As discussed in connection with FIG. 5, coupon card 1 may also include a radio frequency receiver 15 which will be tuned to one or two frequencies. A transmitter station will transmit coupon information in a digital signal which will be received in a digital stream by receiver 15, read by microprocessor 25 and stored in RAM means 23 for future use by the coupon card user. Generally upon registration of the customer with the provider of the pager-based coupon card service, the customer will determine from brochures and the like what types of coupons he would like to receive. Then at a scheduled date(s) and time(s), the coupon data will be broadcast and the coupon card 1 will receive the coupon data. Periodically, new brochures will be published so that the customer may update his coupon selection. This pager method of dispensing coupons allows the coupon card user to consistently obtain coupons with virtually no actions being taken on his part.

While the foregoing systems have been discussed in connection with retail coupon redemption, the present invention has potential applications whenever a printed bar code is used to represent or identify a discount. Illustrative examples could include discounts provided by restaurants or the dry cleaning industry. In particular, fast food restaurants have excellent potential for utilizing the present invention. It is only necessary that fast food coupons be bar coded and participating fast food restaurant chains supply the coupon card service provider with the appropriate redemption requirement data. Fast food restaurants could efficiently position a periphery device at each cash register or in a drive-thru location allowing coupon redemption in the most convenient manner. Whenever a consumer used his coupon card at a fast food restaurant, more fast food coupons could be directly loaded onto the coupon card at the fast food restaurant's periphery device. Additionally, coupon card 1's ability to be identified with a particular user would allow other uses. Such a use could be a paperless "food stamp" or other welfare benefit system. "Food stamps" could be entered electronically onto a coupon card type device and then only be used during the purchase of food products, thus helping to eliminate the wide spread fraud found in the current paper-based food stamp program. Finally, while many parts of the present invention have been described in terms of specific embodiments, it is anticipated that still further alterations and modifications thereof will no doubt become apparent to those skilled in the art. It is therefore intended that the following claims be interpreted as covering all such alterations and modifications as fall within the true spirit and scope of the invention.

The invention claimed is:
1. A coupon management system comprising:
a portable electronic device comprising a microprocessor, memory operatively connected to the microprocessor, an optical scanner operatively connected to the microprocessor, a communications port operatively coupled to the microprocessor; and
a periphery device comprising a display screen and a plurality of operational keys allowing selective manipulation of individual coupon records prior to the coupon records being applied to a sale of goods, the periphery device adapted to perform operations comprising:
receiving, from the portable electronic device, data from coupon records in the portable electronic device;
receiving, from a cash register, purchase data identifying products being purchased;
automatically determining whether products being purchased correspond to coupon records in the portable electronic device; and
in response to determining that products being purchased correspond to coupon records in the portable electronic device, automatically causing corresponding coupon redemption transactions;
wherein the portable electronic device further comprises at least one routine stored in the memory and executable by the microprocessor to perform operations comprising:
scanning coupon bar codes from printed coupons via the optical scanner;
in response to scanning the coupon bar codes, storing, in the memory, coupon records containing at least part of the scanned bar codes;

during a checkout process, sending data from at least one of the coupon records in the portable electronic device to the periphery device;

receiving, from the periphery device, checkout data identifying coupons that are being redeemed during the checkout process; and in response to receiving the checkout data, automatically removing from the memory at least part of the coupon record for each coupon identified as having been redeemed.

2. A coupon management system according to claim 1, wherein the periphery device is adapted to determine whether the products being purchased correspond to coupon records in the portable electronic device, based on (a) the purchase data for the products being purchased and (b) redemption requirement data derived from a source other than the printed coupons.

3. A portable electronic device for managing coupons, the portable electronic device comprising:

a microprocessor;

memory operatively connected to the microprocessor;

an optical scanner operatively connected to the microprocessor, the optical scanner operable to read bar code data from printed coupons;

a communications port operatively coupled to the microprocessor; and at least one routine stored in the memory and executable by the microprocessor to perform operations comprising:

scanning coupon bar codes from printed coupons via the optical scanner;

in response to scanning the coupon bar codes, storing, in the memory, coupon records containing at least part of the scanned bar codes;

during a checkout process, communicating via the communications port with a periphery device containing purchase data from a cash register identifying products being purchased, wherein the operation of communicating comprises:

sending data from at least one of the coupon records in the portable electronic device to the periphery device; and receiving, from the periphery device, checkout data identifying coupons that are being redeemed during the checkout process; and in response to receiving the checkout data, automatically removing from the memory at least part of the coupon record for each coupon identified as having been redeemed.

4. A portable electronic device according to claim 3, further comprising:

a display operatively connected to the microprocessor;

a plurality of operational keys operatively connected to the microprocessor; and programming allowing arrangement of coupon records in selective sub-groups.

5. A portable electronic device according to claim 3, further comprising:

a wireless receiver operatively connected to the microprocessor; and wherein the operations further comprise:

receiving coupon data via the wireless receiver; and in response to receiving the coupon data, automatically storing at least part of the coupon data in the memory.

6. A portable electronic device according to claim 5, wherein the coupon data received via the wireless receiver comprises at least one type of data from the group consisting of:

coupon bar code data; and redemption requirement data.

7. A portable electronic device according to claim 5, wherein the operation of receiving coupon data via the wireless receiver comprises receiving digital pager frequency radio waves comprising the coupon data.

8. A portable electronic device according to claim 3, wherein the operations further comprise:

receiving, from the periphery device, redemption requirement data for coupons; and storing at least part of the redemption requirement data in the memory.

9. A portable electronic device according to claim 8, wherein the redemption requirement data received from the periphery device comprises extra information about at least one of the scanned coupons, beyond the scanned bar code.

10. A portable electronic device according to claim 9, wherein extra information in the redemption requirement data comprises at least one item from the group consisting of:

a product brand name;

a product size requirement for coupon redemption; and a product quantity requirement for coupon redemption.

11. A coupon management system comprising:

the portable electronic device of claim 3; and the periphery device, wherein the periphery device comprises a display and a plurality of operational keys allowing selective manipulation of individual coupon records prior to the coupon records being applied to a sale of goods.

12. A coupon management system comprising:

the portable electronic device of claim 3; and the periphery device, wherein the periphery device comprises:

a first display to provide coupon redemption information to an operator of the cash register;

a second display to provide coupon redemption information to an owner of the portable electronic device; and a plurality of operational keys allowing selective manipulation of individual coupon records prior to the coupon records being applied to a sale of goods.

13. A coupon management system according to claim 11, wherein the periphery device is adapted to perform operations comprising:

receiving, from the cash register, purchase data identifying products being purchased;

receiving, from the portable electronic device, data from at least one of the coupon records;

automatically determining whether products being purchased correspond to coupon records in the portable electronic device; and in response to determining that products being purchased correspond to coupon records in the portable electronic device, automatically causing corresponding coupon redemption transactions.

14. A coupon management system according to claim 13, wherein the periphery device is adapted to send the checkout data to the portable electronic device.

15. A method for managing coupons, the method comprising:

using an optical scanner of a portable electronic device to scan coupon bar codes from printed coupons;

in response to scanning the coupon bar codes, storing, in a memory of the portable electronic device, coupon records containing at least part of the scanned bar codes;

during a checkout process, communicating, via a communications port of the portable electronic device, with a periphery device containing purchase data from a cash register identifying products being purchased, wherein the operation of communicating comprises:
sending data from at least one of the coupon records to the periphery device; and
after sending data from at least one of the coupon records to the periphery device, receiving, from the periphery device, checkout data identifying coupons that are being redeemed during the checkout process; and
in response to receiving the checkout data, automatically removing from the memory at least part of the coupon record for each coupon identified as having been redeemed.

16. A method according to claim 15, further comprising:
receiving, from the periphery device, redemption requirement data for coupons; and
storing at least part of the redemption requirement data in the memory of the portable electronic device.

17. A method according to claim 16, wherein the redemption requirement data received from the periphery device comprises extra information about at least one of the scanned coupons, beyond the scanned bar code.

18. A method according to claim 17, wherein extra information in the redemption requirement data comprises at least one item from the group consisting of:
a product brand name;
a product size requirement for coupon redemption; and
a product quantity requirement for coupon redemption.

19. A method according to claim 15, further comprising:
receiving coupon data at the portable electronic device via a wireless receiver of the portable electronic device; and
in response to receiving the coupon data, automatically storing at least part of the coupon data in the memory of the portable electronic device.

20. A method according to claim 19, wherein the coupon data received via the wireless receiver comprises at least one type of data from the group consisting of:
coupon bar code data; and
redemption requirement data.

21. A method according to claim 19, wherein the operation of receiving coupon data via the wireless receiver comprises receiving digital pager frequency radio waves comprising the coupon data.

* * * * *